US012490332B2

(12) United States Patent
Zhu et al.

(10) Patent No.: US 12,490,332 B2
(45) Date of Patent: Dec. 2, 2025

(54) RLF RECOVERY METHOD AND APPARATUS FOR IAB NETWORK, AND RELATED DEVICE

(71) Applicant: HUAWEI TECHNOLOGIES CO., LTD., Shenzhen (CN)

(72) Inventors: Yuanping Zhu, Shanghai (CN); Haiyan Luo, Shenzhen (CN); Jing Liu, Shanghai (CN); Zhenzhen Cao, Boulogne Billancourtt (FR); Yulong Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 18/304,475

(22) Filed: Apr. 21, 2023

(65) Prior Publication Data

US 2023/0309172 A1 Sep. 28, 2023

Related U.S. Application Data

(63) Continuation of application No. PCT/CN2020/123025, filed on Oct. 22, 2020.

(51) Int. Cl.
*H04W 76/19* (2018.01)

(52) U.S. Cl.
CPC .................................. *H04W 76/19* (2018.02)

(58) Field of Classification Search
CPC ... H04W 76/19; H04W 40/22; H04W 12/106; H04W 40/34; H04W 36/0055; H04W 12/03; H04W 76/14; H04W 36/305; H04W 36/08; H04L 45/28
See application file for complete search history.

(56) References Cited

U.S. PATENT DOCUMENTS

| 2020/0022054 | A1* | 1/2020 | Hong | .................... H04B 17/391 |
| 2020/0267795 | A1* | 8/2020 | Jung | ..................... H04W 36/16 |
| 2021/0112415 | A1* | 4/2021 | Lee | .......................... H04L 69/40 |
| 2023/0388871 | A1* | 11/2023 | Guo | .................. H04W 36/0069 |

(Continued)

FOREIGN PATENT DOCUMENTS

| CN | 110463339 A | 11/2019 |
| CN | 111373837 A | 7/2020 |
| WO | 2020059470 A1 | 3/2020 |

(Continued)

OTHER PUBLICATIONS

NPL Document, "Discussion on IAB RLF and IAB reestablishment" Chongqing, China, 10 Oct. 14-18, 2019 (Year: 2018).*

(Continued)

*Primary Examiner* — Mewale A Ambaye
(74) *Attorney, Agent, or Firm* — Maier & Maier, PLLC

(57) ABSTRACT

A method includes: a first IAB node sets up a first RRC connection to a target IAB donor by performing RLF recovery. The first IAB node sends a first message to a second node by using an SRB 1 or an SRB 2 or the first IAB node sends a BH RLF indication to the second node. The first IAB node sets up an RRC connection to a target IAB donor by performing RLF recovery and the second node is connected to a source IAB donor through the first IAB node. The second node may be triggered to set up an second RRC connection to the target IAB donor based on the first message or the BH RLF indication.

16 Claims, 12 Drawing Sheets

(56) References Cited

U.S. PATENT DOCUMENTS

2024/0056835 A1* 2/2024 Centonza .............. H04W 28/18
2024/0121663 A1* 4/2024 Malik .................... H04L 47/32

FOREIGN PATENT DOCUMENTS

WO        2020069158 A1    4/2020
WO   WO-2020171750 A1 * 8/2020 ............. H04L 45/28

OTHER PUBLICATIONS

Zte et al., "Discussion on IAB RLF and IAB reestablishment". 3GPPTSG RAN WG3 Meeting #105bis, R3-195685, Oct. 14-18, 2019, 7 pages.

"3rd Generation Partnership Project; Technical Specification Group Radio Access Network; NR; Study on Integrated Access and Backhaul;(Release 16)", 3GPP TR 38.874 V16.0.0 (Dec. 2018), 111 pages.

* cited by examiner

RLF RECOVERY METHOD AND APPARATUS FOR IAB NETWORK, AND RELATED DEVICE

CROSS-REFERENCE TO RELATED APPLICATION

This application is a continuation of International Application No. PCT/CN2020/123025, filed on Oct. 22, 2020, the disclosure of which is hereby incorporated by reference in its entirety.

TECHNICAL FIELD

The embodiments relate to the field of wireless communication technologies, an RLF recovery method and apparatus for an IAB network, and a related device.

BACKGROUND

An integrated access and backhaul (JAB) network technology is introduced to a 5th generation (5G) mobile communication system. A wireless transmission solution is used for both an access link and a backhaul link in an IAB network, to avoid optical fiber deployment, thereby reducing deployment costs and improving deployment flexibility.

In the IAB network, an IAB node transmits data to a core network through a source IAB donor. If a radio link failure (RLF) occurs on a backhaul link of the IAB node, the IAB node performs an RLF recovery process, in other words, attempts radio resource control (RRC) re-establishment. In an RRC re-establishment process, the IAB node selects an appropriate cell which is also referred to as an appropriate IAB donor, to perform the RRC re-establishment. If the IAB donor selected by the IAB node is the source IAB donor, because the IAB donor connected to a descendent node served by the IAB node is not changed, the descendent node may not need to perceive whether a topology of the IAB network changes. Instead, the source IAB donor provides new BAP layer routing and/or a BH RLC channel mapping configuration for the descendent node of the IAB node through a new path.

However, the IAB donor selected by the IAB node may not be the source IAB donor, and the newly selected IAB donor is referred to as a target IAB donor. In this case, due to the change of the IAB donor, the target IAB donor cannot correctly perform encryption, decryption, and/or integrity protection on data sent by the descendent node of the IAB node, resulting in service interruption of the descendent node.

SUMMARY

The embodiments may provide an RLF recovery method and apparatus for an IAB network, and a related device, to recover a connection between a second node and a target IAB donor as soon as possible, thereby improving network connection reliability.

According to a first aspect, an RLF recovery method for an IAB network is provided.

The method includes: After an RLF occurs on a first IAB node, or a backhaul radio link failure indication (BH RLF indication) is received, the first IAB node may perform RLF recovery, and set up a first radio resource control (RRC) connection to a target IAB donor when performing an RLF recovery process. After the first IAB node sets up the first RRC connection to the target IAB donor by performing the RLF recovery, the first IAB node sends a first message to a second node by using a signaling radio bearer SRB 1 or an SRB 2, or the first IAB node sends a BH RLF indication to a second node, where the first message or the BH RLF indication is used to set up a second RRC connection between the second node and the target IAB donor, where before the first IAB node sets up the first RRC connection to the target IAB donor by performing the RLF recovery, the second node is connected to a source IAB donor through the first IAB node, and the second node is a child node or a descendent UE of the first IAB node. When the second node is the descendent UE, the descendent UE is not a UE indirectly connected to the first IAB node through a child node.

Because the first message is sent by the first IAB node by using the SRB 1 or the SRB 2, after receiving the first message, the second node triggers RRC re-establishment if integrity protection check on the first message fails. The second node may be triggered to set up the second RRC connection to the target IAB donor based on the first message or the BH RLF indication. In this way, the connection between the second node and the target IAB donor can be recovered as soon as possible, so that network connection reliability is improved.

In an optional implementation of the first aspect, the first message is an RRC message. Before that the first IAB node sends a first message to a second node, and after the first IAB node sets up the first RRC connection to the target IAB donor by performing the RLF recovery, the first IAB node receives a second message from the target IAB donor, where the second message includes an SRB identifier and the RRC message, and the SRB identifier includes an identifier of the SRB 1 and/or an identifier of the SRB 2. The target IAB donor may include a plurality of child nodes, namely, a plurality of first IAB nodes. The target IAB donor generates the RRC message and the SRB identifier, and the first IAB node is responsible for forwarding the RRC message based on the SRB identifier, to facilitate centralized management of the RLF recovery.

In an optional implementation of the first aspect, before that the first IAB node sends a first message to a second node, the first IAB node receives a second message from the target IAB donor, where the second message includes first indication information; and the first IAB node sends the BH RLF indication to the second node based on the first indication information. The first IAB node may include a plurality of child nodes or descendent UEs, namely, a plurality of second nodes. After receiving the first indication information, the first IAB node may send the BH RLF indication to the plurality of second nodes based on the first indication information, so that signaling transmission between the first IAB node and the target IAB donor is reduced.

In an optional implementation of the first aspect, before that the first IAB node sends a first message to a second node, the first IAB node receives a second message from the target IAB donor, where the second message includes first indication information; and the first IAB node sends the first message to the second node based on the first indication information. The first IAB node may include a plurality of child nodes or descendent UEs, namely, a plurality of second nodes. After receiving the first indication information, the first IAB node may send the first message to the plurality of second nodes based on the first indication information, so that signaling transmission between the first IAB node and the target IAB donor is reduced.

In an optional implementation of the first aspect, the second message is an RRC re-establishment message. In a process in which the first IAB node sets up the first RRC connection to the target IAB donor by performing the RLF recovery, the target IAB donor sends the RRC re-establishment message to the first IAB node. The first indication information is carried in the RRC re-establishment message, so that the signaling transmission between the first IAB node and the target IAB donor can be reduced.

In an optional implementation of the first aspect, the first indication information indicates that RRC re-establishment performed by the first IAB node is RRC re-establishment across IAB donors. Only when the RRC re-establishment performed by the first IAB node is the RRC re-establishment across IAB donors, the second node needs to set up the second RRC connection to the target IAB donor. If the first IAB node does not perceive that the performed RRC re-establishment is the RRC re-establishment across IAB donors, the first IAB node does not actively notify the second node to perform the second RRC connection to the target IAB donor. Consequently, the connection between the second node and the target IAB donor cannot be recovered as soon as possible.

In an optional implementation of the first aspect, before the first IAB node sends the first message or the BH RLF indication to the second node, the first IAB node sends an update notification to the second node; the first IAB node broadcasts an updated physical cell identifier (PCI) of the first IAB node, where the update notification indicates the second node to obtain the updated PCI, and the updated PCI is used by the second node to correctly receive the first message or the BH RLF indication. The first IAB node scrambles the first message or the BH RLF indication by using the PCI. If the PCI of the first IAB node changes after the first IAB node changes the IAB donor, the second node cannot correctly descramble the first message or the BH RLF indication by using the old PCI. Therefore, the first IAB node sends the update notification to the second node, so that the second node obtains the updated PCI of the first IAB node, and correctly receives the first message or the BH RLF indication by using the updated PCI. In this way, the second node sets up the second RRC connection to the target IAB donor based on the first message or the BH RLF indication.

In an optional implementation of the first aspect, the method further includes: The first IAB node sends an update notification to the second node.

The first IAB node broadcasts an updated physical cell identifier PCI of the first IAB node, where the update notification indicates the second node to obtain the updated PCI, and the updated PCI is used by the second node to correctly receive the first message.

According to a second aspect, an RLF recovery method for an IAB network is provided.

The method includes: A target IAB donor sends a second message to a first IAB node, where the second message is used by the first IAB node to send a first message to a second node based on the second message by using a signaling radio bearer SRB 1 or an SRB 2, or used by the first IAB node to send a BH RLF indication to a second node, where before the first IAB node sets up the first RRC connection to the target IAB donor by performing RLF recovery, the second node is connected to a source IAB donor through the first IAB node, and the second node is a child node or a descendent UE of the first IAB node.

In an optional implementation of the second aspect, the first message is an RRC message, the second message includes an SRB identifier and the RRC message, and the SRB identifier includes an identifier of the SRB 1 and/or an identifier of the SRB 2. After the first IAB node sets up the first RRC connection to the target IAB donor by performing the RLF recovery, the target IAB donor sends the second message to the first IAB node.

In an optional implementation of the second aspect, the second message is an RRC re-establishment message, the RRC re-establishment message includes first indication information, and the first indication information is used by the first IAB node to send the BH RLF indication to the second node based on the first indication information.

In an optional implementation of the second aspect, the first indication information indicates that RRC re-establishment performed by the first IAB node is RRC re-establishment across IAB donors.

In an optional implementation of the second aspect, the second message further includes an identifier of the second node. Before the first IAB node sets up the first RRC connection to the target IAB donor by performing the RLF recovery, the target IAB donor sends a context obtaining request to the source IAB donor; and the target IAB donor receives a context obtaining response from the source IAB donor, where the context obtaining response includes the identifier of the second node. The target IAB donor may include a plurality of child nodes, namely, a plurality of first IAB nodes. The target IAB donor obtains the identifier of the second node and sends the RRC message to the second node based on the identifier of the second node, to facilitate centralized management of the RLF recovery.

According to a third aspect, an RLF recovery method for an IAB network is provided.

The method includes: A source IAB donor receives a context obtaining request from a target IAB donor.

The source IAB donor sends a context obtaining response to the target IAB donor, where the context obtaining response includes an identifier of a second node, the identifier of the second node is used by a first IAB node to send a first message to the second node based on the identifier of the second node, and the first message is used by the second node to set up the second RRC connection to the target IAB donor, where before the first IAB node sets up the first RRC connection to the target IAB donor by performing RLF recovery, the second node is connected to the source IAB donor through the first IAB node, and the second node is a child node or a descendent UE of the first IAB node.

The second node may set up the second RRC connection to the target IAB donor based on the first message. In this way, the connection between the second node and the target IAB donor can be recovered as soon as possible, so that network connection reliability is improved.

According to a fourth aspect, an RRC reconfiguration method for an IAB network is provided.

The method includes: A target IAB donor sends a first RRC reconfiguration message to a source IAB donor. The target IAB donor receives a third message from the source IAB donor, where the third message is an RRC reconfiguration message obtained by performing encryption and/or integrity protection on the first RRC reconfiguration message. The target IAB donor sends the third message to a second node through a first IAB node, where before the first IAB node sets up the first RRC connection to the target IAB donor by performing RLF recovery, the second node is connected to the source IAB donor through the first IAB node, and the second node is a child node or a descendent UE of the first IAB node. Due to a change of an IAB donor of the second node, the second node cannot directly perform decryption and/or integrity check on the first RRC reconfiguration message.

The target IAB donor sends the third message to the second node, so that an RRC re-establishment process performed by the second node is reduced, and user experience is improved.

In an optional implementation of the fourth aspect, the third message includes a random access-free indication. A random access process of the second node may be omitted based on the indication, so that user experience is improved.

In an optional implementation of the fourth aspect, the third message is a handover command. The handover command may be an RRC reconfiguration message including a synchronization reconfiguration (ReconfigurationwithSync) IE. The second node may perform the second RRC connection for handover of the IAB donor based on the handover command.

According to a fifth aspect, an RRC reconfiguration method for an IAB network is provided.

The method includes: A source IAB donor receives a first RRC reconfiguration message from a target IAB donor.

The source IAB donor sends a third message to the target IAB donor, where the third message is an RRC reconfiguration message obtained by performing encryption and/or integrity protection on the first RRC reconfiguration message, and the third message is used by a second node to set up the second RRC connection to the target IAB donor through a first IAB node, where before the first IAB node sets up the first RRC connection to the target IAB donor by performing RLF recovery, the second node is connected to the source IAB donor through the first IAB node, and the second node is a child node or a descendent UE of the first IAB node.

In an optional implementation of the fifth aspect, the third message includes a random access-free indication.

In an optional implementation of the fifth aspect, the third message is a handover command.

According to a sixth aspect, a PCI update method is provided.

The method includes: A first IAB node sends an update notification to a second node.

The first IAB node broadcasts an updated physical cell identifier PCI of the first IAB node, where the update notification indicates the second node to obtain the updated PCI, and the updated PCI is used by the second node to correctly receive a first message, a BH RLF indication, or a third message.

According to a seventh aspect, a PCI update method is provided.

The method includes: A second node receives an update notification from a first IAB node.

The second node receives an updated physical cell identifier PCI of the first IAB node from the first IAB node based on the update notification.

The second node receives a first message, a BH RLF indication, or a second RRC reconfiguration message based on the updated PCI.

According to an eighth aspect, an RLF recovery apparatus for an IAB network is provided.

The apparatus includes: a setup module, configured to set up a radio resource control (RRC) connection to a target IAB donor by performing RLF recovery; and a sending module, configured to: after the first IAB node sets up the first RRC connection to the target IAB donor by performing the RLF recovery, send a first message to a second node by using a signaling radio bearer SRB 1 or an SRB 2, or send a backhaul radio link failure indication BH RLF indication to a second node, where the first message or the BH RLF indication is used to set up the second RRC connection between the second node and the target IAB donor, where before the first IAB node sets up the first RRC connection to the target IAB donor by performing the RLF recovery, the second node is connected to a source IAB donor through the first IAB node, and the second node is a child node or a descendent UE of the first IAB node.

In an optional implementation of the eighth aspect, the first message is an RRC message, and the apparatus further includes:

a receiving module, configured to receive a second message from the target IAB donor, where the second message includes an SRB identifier and the RRC message, and the SRB identifier includes an identifier of the SRB 1 and/or an identifier of the SRB 2.

In an optional implementation of the eighth aspect, the apparatus further includes: a receiving module, configured to receive the second message from the target IAB donor, where the second message includes first indication information.

The sending module may be configured to send the BH RLF indication to the second node based on the first indication information.

In an optional implementation of the eighth aspect, the second message is an RRC re-establishment message.

In an optional implementation of the eighth aspect, the first indication information indicates that RRC re-establishment performed by the apparatus is RRC re-establishment across IAB donors.

In an optional implementation of the eighth aspect, the sending module is further configured to send an update notification to the second node.

The apparatus further includes:

a broadcasting module, configured to broadcast an updated physical cell identifier PCI of the first IAB node, where the update notification indicates the second node to obtain the updated PCI, and the updated PCI is used by the second node to correctly receive the first message or the BH RLF indication.

According to a ninth aspect, an RLF recovery apparatus for an IAB network is provided.

The apparatus includes: a sending module, configured to send a second message to a first IAB node, where the second message is used by the first IAB node to send a first message to a second node based on the second message by using a signaling radio bearer SRB 1 or an SRB 2, or used by the first IAB node to send a backhaul radio link failure indication BH RLF indication to a second node, where before the first IAB node sets up the first RRC connection to the target IAB donor by performing RLF recovery, the second node is connected to a source IAB donor through the first IAB node, and the second node is a child node or a descendent UE of the first IAB node.

In an optional implementation of the ninth aspect, the first message is an RRC message, the second message includes an SRB identifier and the RRC message, and the SRB identifier includes an identifier of the SRB 1 and/or an identifier of the SRB 2.

The sending module may be configured to: after the first IAB node sets up the first RRC connection to the target IAB donor by performing the RLF recovery, send the second message to the first IAB node.

In an optional implementation of the ninth aspect, the second message is an RRC re-establishment message, the RRC re-establishment message includes first indication information, and the first indication information is used by the first IAB node to send the BH RLF indication to the second node based on the first indication information.

In an optional implementation of the ninth aspect, the first indication information indicates that RRC re-establishment performed by the first IAB node is RRC re-establishment across IAB donors.

In an optional implementation of the ninth aspect, the second message further includes an identifier of the second node.

The sending module is further configured to send a context obtaining request to the source IAB donor.

The apparatus further includes:
 a receiving module, configured to receive a context obtaining response from the source IAB donor, where the context obtaining response includes the identifier of the second node.

According to a tenth aspect, an RLF recovery apparatus for an IAB network is provided.

The apparatus includes: a receiving module, configured to receive a context obtaining request from a target IAB donor; and a sending module, configured to send a context obtaining response to the target IAB donor, where the context obtaining response includes an identifier of a second node, the identifier of the second node is used by a first IAB node to send a first message to the second node based on the identifier of the second node, and the first message is used by the second node to set up the second RRC connection to the target IAB donor, where before the first IAB node sets up the first RRC connection to the target IAB donor by performing RLF recovery, the second node is connected to the apparatus through the first IAB node, and the second node is a child node or a descendent UE of the first IAB node.

According to an eleventh aspect, an RRC reconfiguration apparatus for an IAB network is provided.

The apparatus includes: a first sending module, configured to send a first RRC reconfiguration message to a source IAB donor;
 a receiving module, configured to receive a third message from the source IAB donor, where the third message is an RRC reconfiguration message obtained by performing encryption and/or integrity protection on the first RRC reconfiguration message; and
 a second sending module, configured to send the third message to a second node through a first IAB node, where before the first IAB node sets up the first RRC connection to the target IAB donor by performing RLF recovery, the second node is connected to the source IAB donor through the first IAB node, and the second node is a child node or a descendent UE of the first IAB node.

In an optional implementation of the eleventh aspect, the third message includes a random access-free indication.

In an optional implementation of the eleventh aspect, the third message is a handover command.

According to a twelfth aspect, an RRC reconfiguration apparatus for an IAB network is provided.

The apparatus includes: a receiving module, configured to receive a first RRC reconfiguration message from a target IAB donor; and
 a sending module, configured to send a third message to the target IAB donor, where the third message is an RRC reconfiguration message obtained by performing encryption and/or integrity protection on the first RRC reconfiguration message, and the third message is used by the target IAB donor to send the third message to a second node through a first IAB node, where before the first IAB node sets up the first RRC connection to the target IAB donor by performing RLF recovery, the second node is connected to the source IAB donor through the first IAB node, and the second node is a child node or a descendent UE of the first IAB node.

In an optional implementation of the twelfth aspect, the third message includes a random access-free indication.

In an optional implementation of the twelfth aspect, the third message is a handover command.

According to a thirteenth aspect, a PCI update apparatus is provided.

The apparatus includes: a sending module, configured to send an update notification to a second node; and
 a broadcasting module, configured to broadcast an updated physical cell identifier PCI of a first IAB node, where the update notification indicates the second node to obtain the updated PCI, and the updated PCI is used by the second node to correctly receive a first message, a BH RLF indication, or a third message.

According to a fourteenth aspect, a PCI update apparatus is provided.

The apparatus includes: a first receiving module, configured to receive an update notification from a first IAB node;
 a second receiving module, configured to receive an updated physical cell identifier PCI of the first IAB node from the first IAB node based on the update notification; and
 a third receiving module, configured to receive a first message, a BH RLF indication, or a third message based on the updated PCI.

According to a fifteenth aspect, a communication apparatus is provided. The apparatus is configured to perform the method in any one of the foregoing aspects or the possible implementations of the aspects.

According to a sixteenth aspect, a communication apparatus is provided. The apparatus includes a processor. The processor is configured to perform the method in any one of the foregoing aspects or the possible implementations of the aspects.

According to a seventeenth aspect, a communication apparatus is provided. The apparatus includes a processor and a memory. The memory is configured to store a computer program. The processor is configured to: invoke the computer program from the memory, and run the computer program, to enable the communication device to perform the method according to any one of the foregoing aspects or the possible implementations of the aspects.

According to an eighteenth aspect, a chip is provided. The chip includes a processor and a data interface. The processor reads, through the data interface, program instructions stored in a memory, to perform the method in any one of the foregoing aspects or the possible implementations of the aspects.

According to a nineteenth aspect, an integrated access and backhaul IAB network system is provided. The system includes a first IAB node, a second node, a source IAB donor, and a target IAB donor.

The first IAB node is configured to perform the method in any one of the first aspect or the possible implementations of the first aspect.

The target IAB donor is configured to perform the method in any one of the second aspect or the possible implementations of the second aspect.

The source IAB donor is configured to perform the method in any one of the third aspect or the possible implementations of the third aspect.

According to a twentieth aspect, an integrated access and backhaul IAB network system is provided. The system includes a first IAB node, a second node, a source IAB donor, and a target IAB donor.

The target IAB donor is configured to perform the method in any one of the fourth aspect or the possible implementations of the fourth aspect.

The source IAB donor is configured to perform the method in any one of the fifth aspect or the possible implementations of the fifth aspect.

The first IAB node is configured to perform the method in any one of the sixth aspect or the possible implementations of the sixth aspect.

The second node is configured to perform the method in any one of the seventh aspect or the possible implementations of the seventh aspect.

According to a twenty-first aspect, a non-transitory computer-readable storage medium is provided. The non-transitory computer-readable medium stores a computer program executed by a device. The computer program includes program instructions for performing the method in any one of the foregoing aspects or the possible implementations of the aspects.

According to a twenty-second aspect, a computer program product, including a computer program is provided. When the computer program product runs on a computer device, the computer device is enabled to perform the method in any one of the foregoing aspects or the possible implementations of the aspects.

DETAILED DESCRIPTION OF THE EMBODIMENTS

Figure 1:
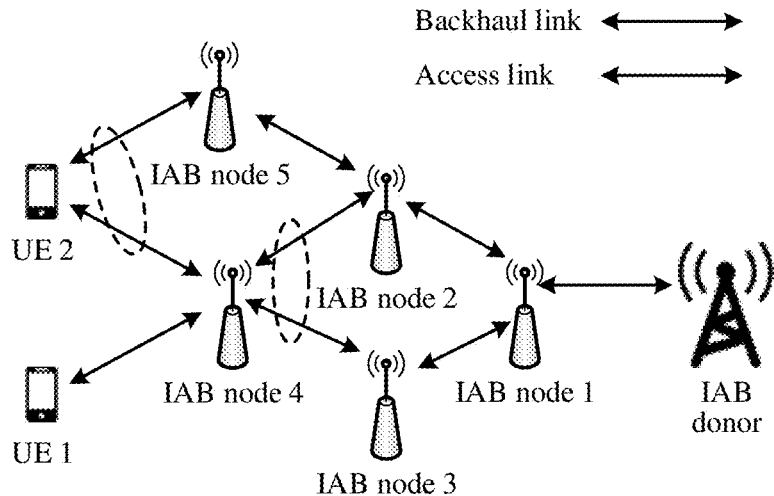
FIG. 1 is a schematic diagram of standalone IAB networking.

The embodiments may be applied to the field of wireless communication technologies and may provide an RLF recovery method and apparatus for an IAB network, and a related device, to recover a connection between a second node and a target IAB donor as soon as possible, thereby improving network connection reliability. It should be understood that features or content marked by dashed lines in the accompanying drawings in the embodiments may be understood as optional operations or optional structures in the embodiments. In descriptions of the embodiments, terms such as "first" and "second" are used only for distinction and description but cannot be understood as indicating or implying relative importance, or as indicating or implying a sequence. The embodiments may be applied to various communication systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, and a future evolved communication system.

A user equipment (UE) in the embodiments is a device having a wireless transceiver function. The UE is also referred to as a terminal device, a mobile station, a remote station, or the like. The terminal device may be deployed on land, including being deployed indoor, outdoor, handheld, wearable, or in-vehicle; or may be deployed on a water surface (for example, on a ship); or may be deployed in the air (for example, on an airplane, a balloon, or a satellite). The terminal device may communicate with a core network through a radio access network (RAN), and exchange voice and/or data with the RAN. The terminal device may be a mobile phone, a tablet computer (Pad), a computer having a wireless transceiver function, a mobile internet device (MID), a wearable device, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments. A technology, a device form, and a name used by the terminal device are not limited in the embodiments.

An IAB node (JAB node) in the embodiments may be an access network device, and the access network device is a device that is in a network and that is configured to connect the terminal device to a wireless network. The access network device may be a node in the radio access network and may also be referred to as a base station or a radio access network (RAN) node (or device). A network device may include an evolved NodeB (NodeB, eNB, or e-NodeB) in a long term evolution (LTE) system or an LTE-advanced (LTE-A) system, for example, a conventional macro base station eNB and a micro base station eNB in a heterogeneous network scenario; or may be a next generation NodeB (gNB) in a 5th generation (5G) mobile communication technology new radio (NR) system; or may include a radio network controller (RNC), a NodeB (NB), a base station controller (BSC), a base transceiver station (BTS), a transmission reception point (TRP), a home base station (for example, a home evolved NodeB or a home NodeB, HNB), a baseband unit (BBU), a baseband pool BBU pool, a Wi-Fi access point (AP), or the like; or may include a central unit (CU) and a distributed unit (DU) in a cloud radio access network (CloudRAN) system. This is not limited in the embodiments. In a split deployment scenario in which the access network device includes the CU and the DU, the CU supports protocols such as a radio resource control (RRC) protocol, a packet data convergence protocol (PDCP), and a service data adaptation protocol (SDAP), and the DU may support a radio link control (RLC) layer protocol, a media access control (MAC) layer protocol, and a physical layer protocol.

Compared with a 4th generation mobile communication system, a 5th generation (5G) mobile communication system comprehensively raises stricter requirements on various network performance indicators. For example, a capacity indicator is increased by 1000 times, wider coverage is required, and ultra-high reliability and an ultra-low latency are required. In consideration of rich frequency resources on high-frequency carriers, networking using high-frequency small cells is increasingly popular in hotspot areas, to meet an ultra-high capacity requirement of 5G. The high-frequency carrier has a poor propagation characteristic, is severely attenuated due to blocking, and has small coverage. Consequently, a large quantity of small cells may need to be densely deployed. Correspondingly, it is quite costly to provide fiber backhaul for the large quantity of small cells that are densely deployed, and construction is difficult. Therefore, an economical and convenient backhaul solution is required. In addition, from a perspective of a wide coverage requirement, it is difficult and costly to deploy optical fibers to provide network coverage in some remote areas. Therefore, a flexible and convenient access and backhaul solution may be needed. An integrated access and backhaul (JAB) technology may provide a solution to resolve the foregoing two problems. A wireless transmission solution is used for both an access link and a backhaul link in an IAB network, to avoid optical fiber deployment.

In the IAB network, an IAB node which is also referred to as a relay node (RN) may provide a radio access service for a UE. Service data of the UE is transmitted by the IAB node to an IAB donor over a wireless backhaul link. The IAB donor may also be referred to as a donor node, a donor base station (DgNB), a donor network device, or the like. The IAB node may include a mobile termination (MT) and a distributed unit (DU). When the IAB node is oriented to a parent node of the IAB node, the IAB node may be considered as a terminal device, namely, a role of the MT. When the IAB node is oriented to a child node of the IAB node (where the child node may be another IAB node or a common UE), the IAB node may be considered as a network device, namely, a role of the DU. The MT of the IAB node has a part or all of functions of the UE. The IAB donor may be an access network element having a complete base station function or may be an access network element in a form in which a central unit (CU) and a distributed unit (DU) are split. The IAB donor is connected to a core network (for example, connected to a 5G core network, 5GC) element serving the UE, and provides a wireless backhaul function for the IAB node. For ease of description, a central unit of the IAB donor is briefly referred to as a donor CU (or directly referred to as a CU), and a distributed unit of the IAB donor is briefly referred to as a donor DU. The IAB donor may alternatively be in a form in which a control plane (CP) and a user plane (UP) are split. For example, the CU may include one CU-CP and one CU-UP (or more CU-UPs).

In a current 5G standard, in consideration of small coverage of high-frequency bands, multi-hop networking may be used in the IAB network, to ensure network coverage performance. In addition, in consideration of a requirement of service transmission reliability, the IAB node may be enabled to support dual connectivity (DC) or multi-connectivity, to cope with potential exceptions occurring on the backhaul link, for example, link interruption or blockage and load fluctuation, to improve transmission reliability. Therefore, the IAB network supports multi-hop networking, and may further support multi-connectivity networking. There is at least one transmission path including a plurality of links between the UE served by the IAB node and the IAB donor. There may be a plurality of nodes on a transmission path such as a UE, one or more IAB nodes, and an IAB donor (where an IAB-donor-DU and an IAB-donor-CU are further included if the IAB donor is in a CU-DU split form). Each IAB node considers a neighboring node that provides an access and backhaul service for the IAB node as a parent IAB node (which may be briefly referred to as a parent node). Correspondingly, each IAB node may be considered as a child IAB node (which may be briefly referred to as a child node) of the parent node of the IAB node. If data of the IAB node or the UE needs to be transmitted through an IAB node, the IAB node or the UE is a descendent node of the IAB node. For example, a child node or a grandchild node of an IAB node is a descendent node of the IAB node. The IAB donor may be the access network device. If the IAB donor uses a CU-DU split architecture, the IAB donor may be an IAB-donor-CU. Further, if the CU of the IAB donor uses the CP-UP split architecture, the IAB donor may be an IAB-donor-CU-CP. For ease of description, the foregoing devices are collectively referred to the IAB donor.

Further, the UE in the IAB network may further provide a network connection for a descendent UE of the UE through a UE-to-network architecture or a UE-to-UE architecture.

In the embodiments, the relay device or the IAB node may alternatively be a UE. In this case, the UE serves as a relay node in the UE-to-network scenario or the UE-to-UE scenario. In this case, the IAB donor in the embodiments may be a base station device (for example, a 5G base station device gNB or an LTE base station eNB).

FIG. 1 is a schematic diagram of standalone IAB networking. In the figure, a parent node of an IAB node 1 is an IAB donor, the IAB node 1 is a parent node of an IAB node 2 and an IAB node 3, both the IAB node 2 and the IAB node 3 are parent nodes of an IAB node 4, and a parent node of an IAB node 5 is the IAB node 3. An uplink data packet of a UE may be transmitted to a donor site, namely, the IAB donor, through one or more IAB nodes; and then sent by the IAB donor to a mobile gateway device (for example, a user plane function unit UPF in a 5G core network). A downlink data packet is received by the IAB donor from the mobile gateway device and then sent to the UE through the IAB node. In the standalone (SA) IAB networking shown in FIG. 1, both the IAB node and the UE are connected to a network only through NR-standard air interfaces. It should be understood that the standalone IAB networking scenario shown in FIG. 1 is merely an example. In an IAB scenario of a combination of multi-hop and multi-connectivity, there are more other possibilities. For example, the IAB donor in the figure and a descendent IAB node of another IAB donor provides dual connectivity to serve the UE. This is not limited.

Figure 2:
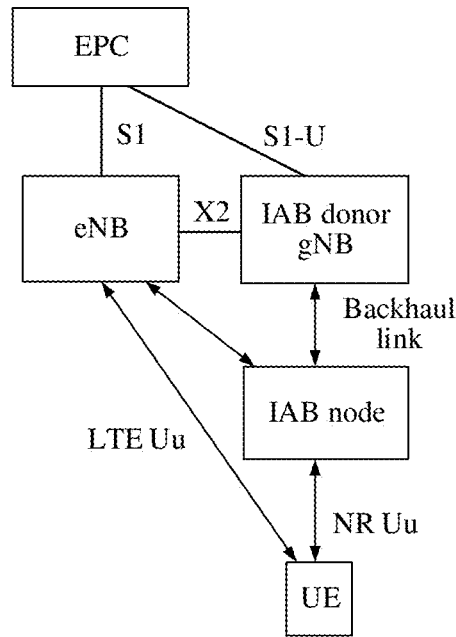
FIG. 2 is a schematic diagram of non-standalone IAB networking.

The IAB network also supports non-standalone (NSA) networking. FIG. 2 is a schematic diagram of non-standalone IAB networking. An IAB node supports dual connectivity in 4G and 5G networks, namely, EN-DC (E-UTRAN NR dual connectivity). An LTE base station eNB is a master base station (master eNB, MeNB), which provides an LTE air interface (LTE Uu) connection for the IAB node and sets up an S1 interface with a 4G core network, namely, an evolved packet core network (EPC), for user plane and control plane transmission. An IAB donor gNB is a secondary base station, which provides an NR air interface (NR Uu) connection for the IAB node and sets up an S1 interface with the core network EPC for user plane transmission. Similarly, a UE also supports the EN-DC. The UE is connected to the master base station eNB through the LTE Uu interface and is connected to a secondary base station IAB node through the NR Uu interface. The secondary base station of the UE may also be the IAB donor gNB. The non-standalone IAB networking scenario may also be referred to as an IAB EN-DC networking scenario.

It should be understood that FIG. 2 is merely a networking example. The NSA scenario of the IAB network also supports multi-hop IAB networking. For example, the UE in FIG. 2 may be another IAB node. An IAB node may be connected to the IAB donor gNB over a multi-hop wireless backhaul link. This is not limited.

In current discussion of the IAB network, it is determined to introduce a new protocol layer, namely, a backhaul adaptation protocol (BAP) layer, to a wireless backhaul link. The protocol layer is located above a radio link control (RLC) layer and implements functions such as routing of a data packet over the wireless backhaul link and bearer mapping.

An F1 interface needs to be set up between an IAB node (or an IAB-DU) and a IAB donor (or an IAB-donor-CU). The interface supports a user plane protocol (F1-U) and a control plane protocol (F1-C). The user plane protocol includes one or more of the following protocol layers: a general packet radio service (GPRS) tunneling protocol user plane (GTP-U), a user datagram protocol (UDP), an internet protocol (IP), or the like. The control plane protocol of the interface includes one or more of the following protocol layers: an F1 application protocol (F1AP) layer, a stream control transport protocol (SCTP), an IP, or the like.

Figure 3:
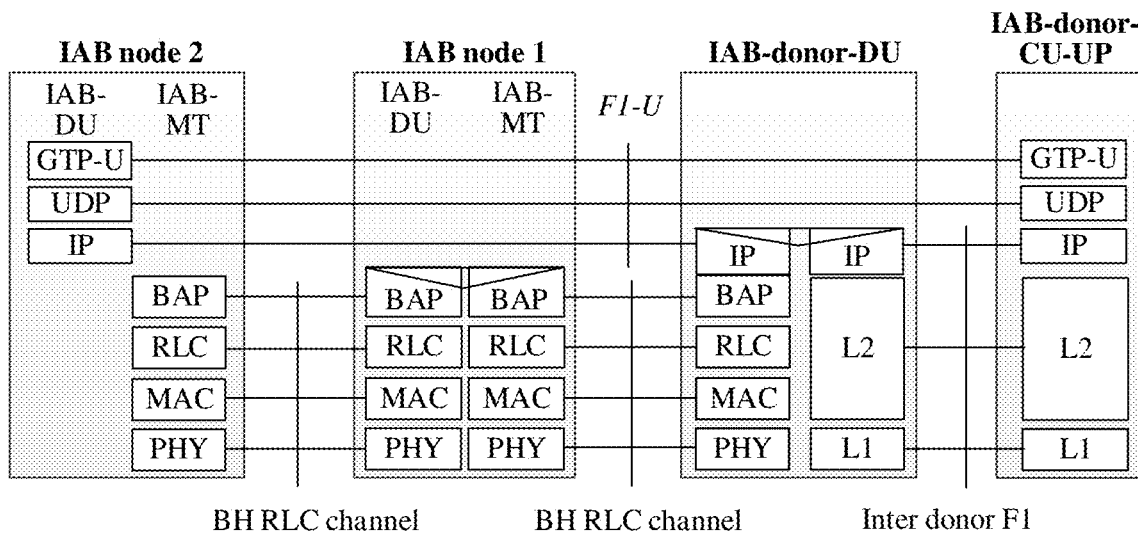
FIG. 3 is a schematic diagram of a user plane protocol stack of an IAB network.
Figure 4:
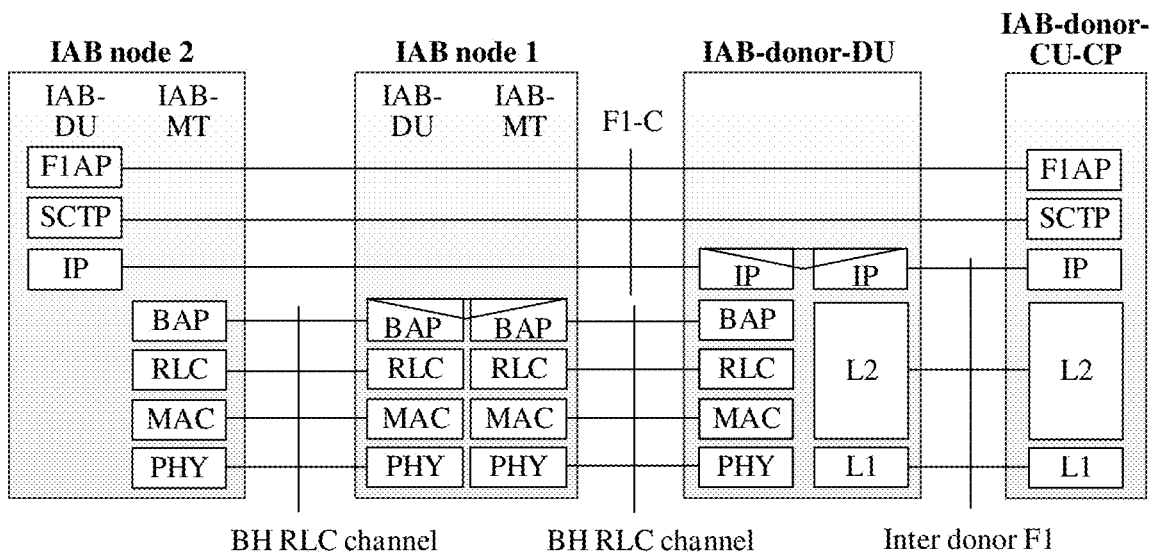
FIG. 4 is a schematic diagram of a control plane protocol stack of an IAB network.

FIG. 3 and FIG. 4 are respectively a schematic diagram of a user plane protocol stack of an IAB network and a schematic diagram of a control plane protocol stack of an IAB network. Through a control plane of an F1 interface, interface management, IAB-DU management, UE context related configuration, and the like may be performed between an IAB node and an IAB donor. Through a user plane of the F1 interface, functions such as user plane data transmission and downlink transmission status feedback may be performed between the IAB node and the IAB donor node.

Figure 5:
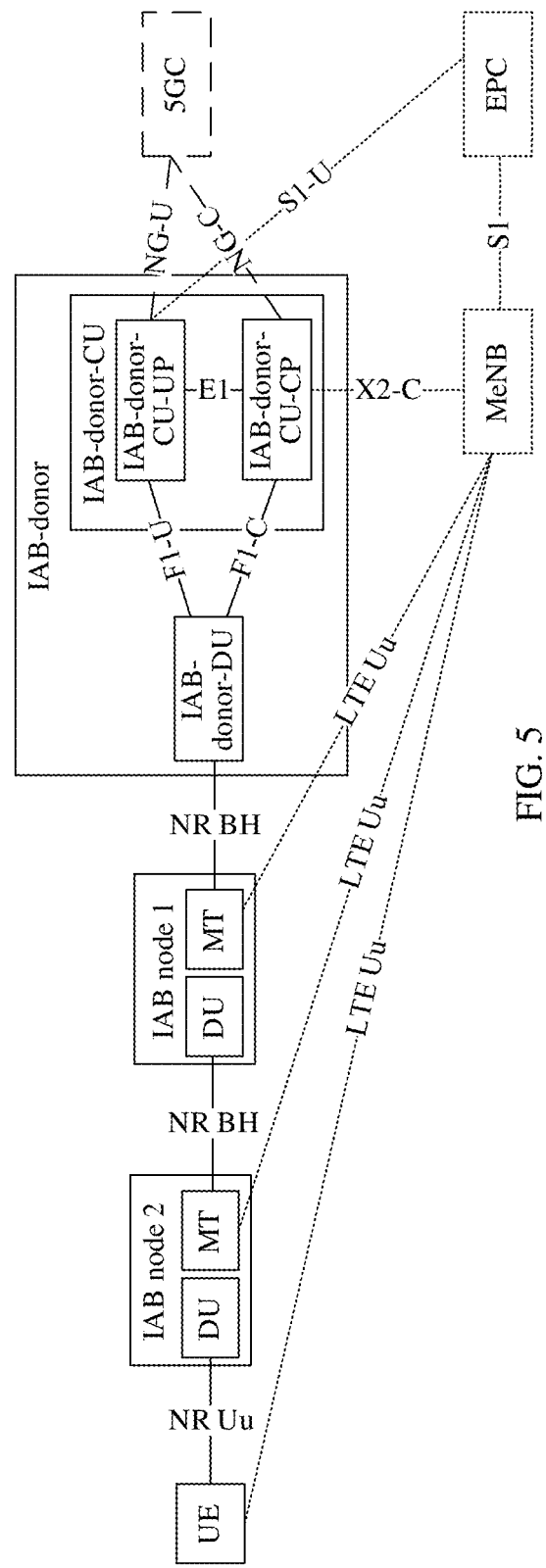
FIG. 5 is a schematic diagram of a system architecture of an IAB network according to an embodiment.

FIG. 5 is a schematic diagram of a system architecture of an IAB network according to an embodiment. The system architecture includes an IAB network supporting standalone (SA) networking and an IAB network supporting non-standalone (NSA) networking. For system architectures of the two networking scenarios, refer to the foregoing descriptions of standalone networking and non-standalone networking. It can be understood from the foregoing descriptions that the IAB node includes the MT and the DU, the IAB donor may be further divided into the DU and the CU, and the CU may be further divided into the CU-CP and the CU-UP. FIG. 5 further shows, based on the nodes, an example architecture in which the IAB node is connected to the IAB donor over a wireless backhaul link.

When the IAB node operates in SA mode, the IAB donor can be connected to a 5G core network (5GC) network, which is denoted by dot-dashed lines in the figure. An IAB-donor-CU-CP is connected to a control plane network element (for example, an access and mobility management function AMF) in the 5GC through an NG control plane interface, and an IAB-donor-CU-UP is connected to a user plane network element (for example, a user plane function UPF) in the 5GC through an NG user plane interface. When the IAB node operates in NSA mode (or EN-DC mode), the IAB-donor-CU-UP can be connected to an EPC (for example, connected to a serving gateway (SGW)) through an S1 user plane interface. There is an LTE Uu air interface connection between an MeNB and the MT of the IAB node. There is an X2-C interface between the MeNB and the IAB-donor-CU-CP. The MeNB is connected to the EPC through an S1 interface (including an S1 interface user plane and an S1 interface control plane). These are denoted by dotted lines in the figure.

In this embodiment, a first IAB node may be a parent node, and a second node is a child node or a descendent UE of the first IAB node. For example, the IAB node 1 in FIG. 1 may be the first IAB node, and the IAB node 2 and the IAB node 3 may be the second nodes. In this case, the second nodes (the IAB node 2 and the IAB node 3) may communicate with the IAB donor through the first IAB node. For another example, the IAB node 4 in FIG. 1 may be the first IAB node, and the UE 2 and the UE 1 may be the second nodes. In this case, the second nodes (the UE 2 and the UE 1) may communicate with the IAB donor through the first IAB node. A quantity of IAB nodes between the first IAB node and the IAB donor is not limited.

In the current IAB network, when an IAB node initially accesses the network, the IAB node may obtain an IP address of a DU of the IAB node from an IAB donor or an OAM. The obtained IP address may be used for subsequent service transmission of the IAB node (which may be an IAB-DU), for example, transmission of an F1 interface service or a non-F1 interface service. The IP address obtained by the IAB node is related to an IAB-donor-DU to which the IAB node is connected. This can ensure that the IP address of the IAB node is reachable through IP routing.

When a radio link failure RLF occurs on the IAB node in the IAB network, the IAB node performs an RLF recovery process, in other words, attempts to perform RRC re-establishment. In another case, after an RLF occurs on a parent node of the IAB node and the recovery fails, the parent node of the IAB node sends a BH RLF notification to the IAB node. After the IAB node receives the BH RLF notification, subsequent behavior of the IAB node is similar to subsequent behavior of the IAB node when the RLF occurs, for example, RLF recovery. In the re-establishment process, the IAB node may select an original cell for re-access or may select a new cell for access. When the RLF recovery performed by the IAB node succeeds, if the IAB node is still connected to an original IAB donor CU after the re-establishment, an original communication link may be used for data transmission because the IAB donor CU knows a network topology relationship between the IAB node and a descendent IAB node or a descendent UE (which is an IAB node or a UE connected to a serving cell of the IAB node). Alternatively, if the IAB node is connected to an original IAB donor CU through a new parent node, the IAB donor CU may re-establish a connection to the IAB node and a descendent IAB node or a descendent UE of the IAB node based on a new network topology. Further, if the IAB node is connected to the original IAB donor CU through a new IAB donor DU, the IAB donor CU may allocate a new IP address to the IAB node and the descendent IAB node of the IAB node.

However, in a scenario in which the IAB node serving as a parent node performs RLF recovery and is connected to a new IAB donor CU, or after the IAB node serving as a parent node in the IAB network determines to be disconnected from a source IAB donor CU and connected to a new target IAB donor CU, the target IAB donor CU does not know the network topology relationship between the IAB node and the child node or the descendent UE of the IAB node. In addition, the child node or the descendent UE of the IAB node does not perceive the RLF recovery process of the IAB node serving as the parent node. The child IAB node or the descendent UE of the IAB node still considers that the child IAB node or the descendent UE can be connected to a source IAB donor through the IAB node. However, in this case, the connection to the source IAB donor has actually been lost. As a result, the child node or the descendent UE cannot initiate a request for re-establishing a connection to a new IAB donor. Consequently, the child node or the descendent UE cannot continue operating normally (the child node or the descendent UE can neither transmit a service of the child node or the descendent UE, nor provide a service transmission service for another node connected to the child node or the descendent UE). Therefore, for the child node or the descendent UE of the IAB node, how to recover the connection to the target IAB donor as soon as possible, to improve network connection reliability is a problem that needs to be resolved. Therefore, the embodiments may provide an RLF recovery method for an IAB network. When a radio link failure RLF occurs on a first IAB node, or after a first IAB node receives first indication information (for example, a BH RLF indication) that is sent by a parent node and that indicates that a radio link failure or a radio link recovery failure occurs on the parent node, the first IAB node performs RLF recovery. If the first IAB node sets up the first RRC connection to a target IAB donor after performing the RLF recovery, the first IAB node sends a first message to a second node by using an SRB 1 or an SRB 2, or the first IAB node sends second indication information to a second node. The second indication information indicates that a radio link failure occurs on the first IAB node, or that an RLF recovery process is performed but the recovery fails (where the second indication information may be, for example, a BH RLF indication). In this way, the second node can set up the second RRC connection to the target IAB donor. The second node is a child node of the IAB node or a UE (referred to as a descendent UE of the IAB node for short) that accesses a cell served by the IAB node. This avoids a problem that the second node cannot continue service data and signaling transmission because the second node does not perceive that the IAB node changes an IAB donor.

Figure 6:
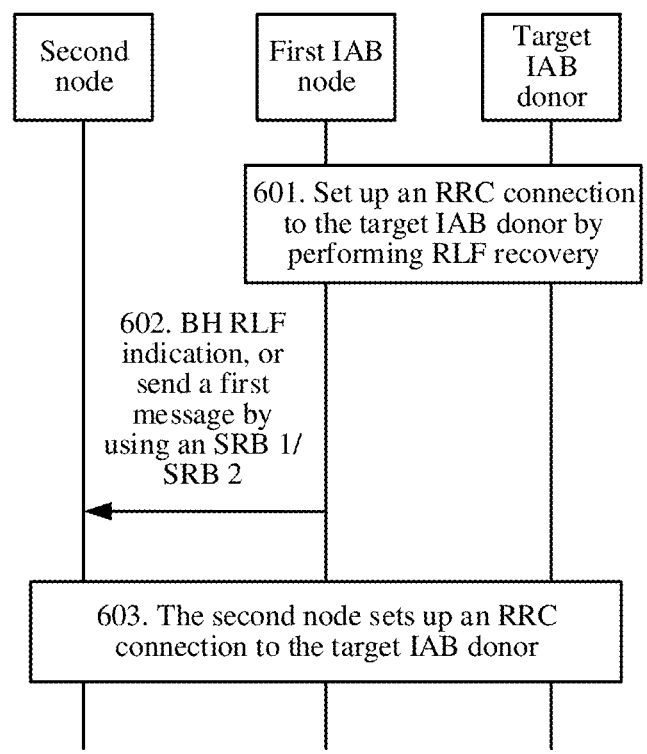
FIG. 6 is a schematic flowchart of an RLF recovery method for an IAB network according to an embodiment.

FIG. 6 is a schematic flowchart of an RLF recovery method for an IAB network according to an embodiment.

In step 601, a first IAB node sets up the first RRC connection to a target IAB donor by performing RLF recovery.

When an RLF occurs on the first IAB node, or after the first IAB node receives first indication information (for example, a BH RLF indication) that is sent by a parent node and that indicates that a radio link failure or a radio link recovery failure occurs on the parent node, or after the first IAB node is disconnected from a source IAB donor, the first IAB node may perform an RLF recovery process. In the RLF recovery process, the first IAB node initiates an RRC connection re-establishment process and sets up the first RRC connection to the target IAB donor.

In step 602, the first IAB node sends second indication information to a second node, where the second indication information indicates that a radio link failure occurs on the first IAB node or the RLF recovery process is performed but the recovery fails (where the second indication information may be, for example, a BH RLF indication). Alternatively, the first IAB node sends a first message to a second node by using an SRB 1/SRB 2. The second node is a child node of the IAB node or a UE (referred to as a descendent UE of the IAB node for short) that accesses a cell served by the IAB node.

Before the first IAB node performs RLF recovery, the second node is connected to the source IAB donor through the first IAB node. After the first IAB node is connected to the target IAB donor by perform RRC re-establishment, the second node does not perceive that the first IAB node changes an IAB donor. Therefore, the first IAB node sends the second indication information to the second node, or the first IAB node sends the first message to the second node by using the SRB 1/SRB 2.

In step 603, the second node sets up the second RRC connection to the target IAB donor.

After the second node receives the second indication information (for example, the BH RLF indication) sent by the first IAB node, the second node may initiate an RRC connection re-establishment process to set up the second RRC connection to the target IAB donor. Alternatively, because the second node receives the first message by using the SRB 1/SRB 2, but integrity check performed by the second node on the first message fails, the second node may also initiate an RRC connection re-establishment process (for example, initiate an RRC re-establishment request to the target IAB donor) to set up the second RRC connection to the target IAB donor.

In this embodiment, after being disconnected from the initial source IAB donor and connected to a new target IAB donor, the first IAB node serving as the parent node may send the second indication information (for example, the BH RLF indication) to the second node, or send the first message to the second node by using the SRB 1/SRB 2, so that the second node (the child node or the descendent UE of the first IAB node) can trigger the RRC connection re-establishment process. This avoids a problem that the second node cannot continue service data and signaling transmission because the second node does not perceive that the first IAB node changes the IAB donor. In this way, the connection between the second node and the target IAB donor can be recovered as soon as possible, so that network connection reliability is improved.

It can be understood from the foregoing descriptions that this embodiment may be used in an IAB network with variable scenarios (where a quantity of IAB nodes between the first IAB node and the source IAB donor and between the first IAB node and the target IAB donor is uncertain, and a quantity of descendent nodes of the first IAB node is also uncertain). Therefore, the RLF recovery method for the IAB network provided in this embodiment can be used provided that the IAB network includes the second node, the first IAB node, the source IAB donor, and the target IAB donor. In this way, after the first IAB node changes the IAB donor, the connection between the second node and the target IAB donor is recovered as soon as possible, so that the network connection reliability is improved. The following describes the RLF recovery method for the IAB network with reference to a scenario. It should be determined that this scenario is merely intended to facilitate understanding of the embodiments and should not be used as a limiting condition.

Figure 7:
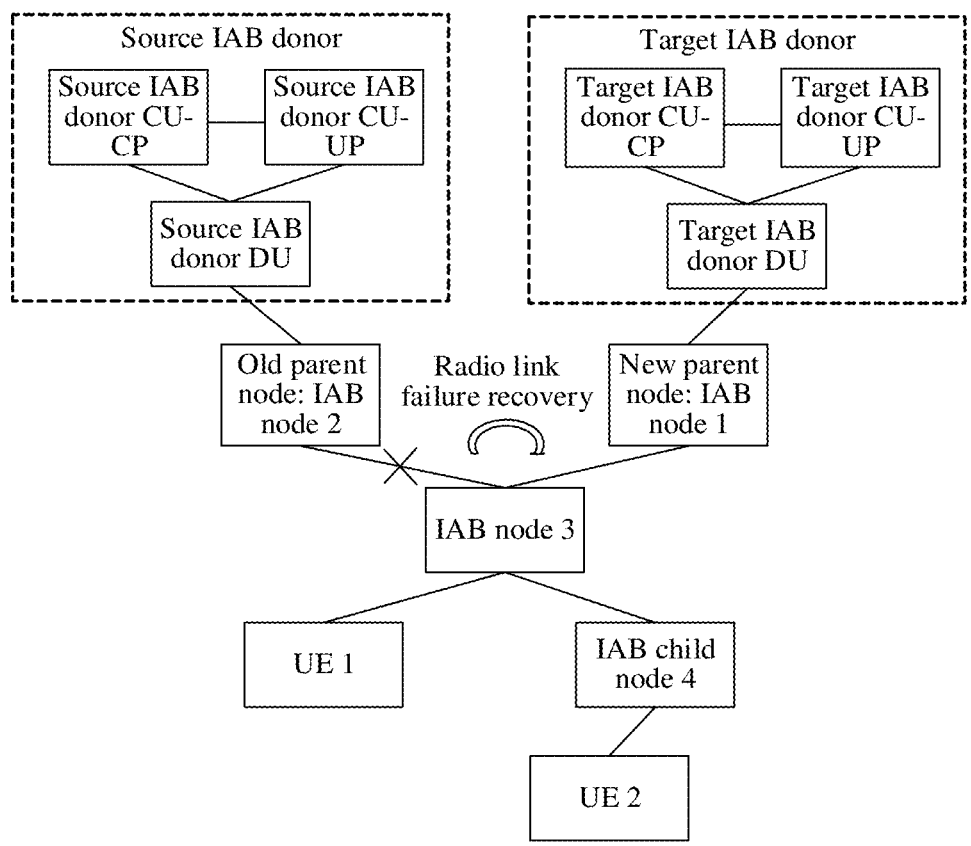
FIG. 7 is a schematic diagram of an RLF recovery scenario according to an embodiment.

FIG. 7 is a schematic diagram of an RLF recovery scenario according to an embodiment. As shown in FIG. 7, a node on which a radio link failure occurs and that attempts to perform recovery is an IAB node 3, and the IAB node 3 may provide access and backhaul services for one or more UEs/child nodes. FIG. 7 shows a child node, namely, an IAB node 4, and a UE 1 that accesses a cell served by the IAB node 3. There is a descendent UE 2 of the IAB node 4, and the UE 2 accesses a cell served by the IAB node 4. In an actual network deployment scenario, the IAB node 3 may have one or more grandchild nodes (namely, IAB nodes connected to the IAB node 3 over a wireless backhaul link having at least two hops). The IAB node 4 may further serve more UEs, child nodes, or grandchild nodes, which are not shown one by one in the figure. However, it should be understood that these possible scenarios are not limited by the example in FIG. 7.

For ease of description, these IAB nodes or UEs connected to the IAB donor through the IAB node 3 are referred to as descendent IAB nodes (descendent IAB nodes) or descendent UEs of the IAB node 3. In this embodiment, the source IAB donor may also be referred to as an initial IAB donor or an old IAB donor, the target IAB donor may also be referred to as a new IAB donor, the IAB node 3 is also referred to as the first IAB node, and the UE 1 or the child IAB node 4 is also referred to as the second node.

Figure 8:
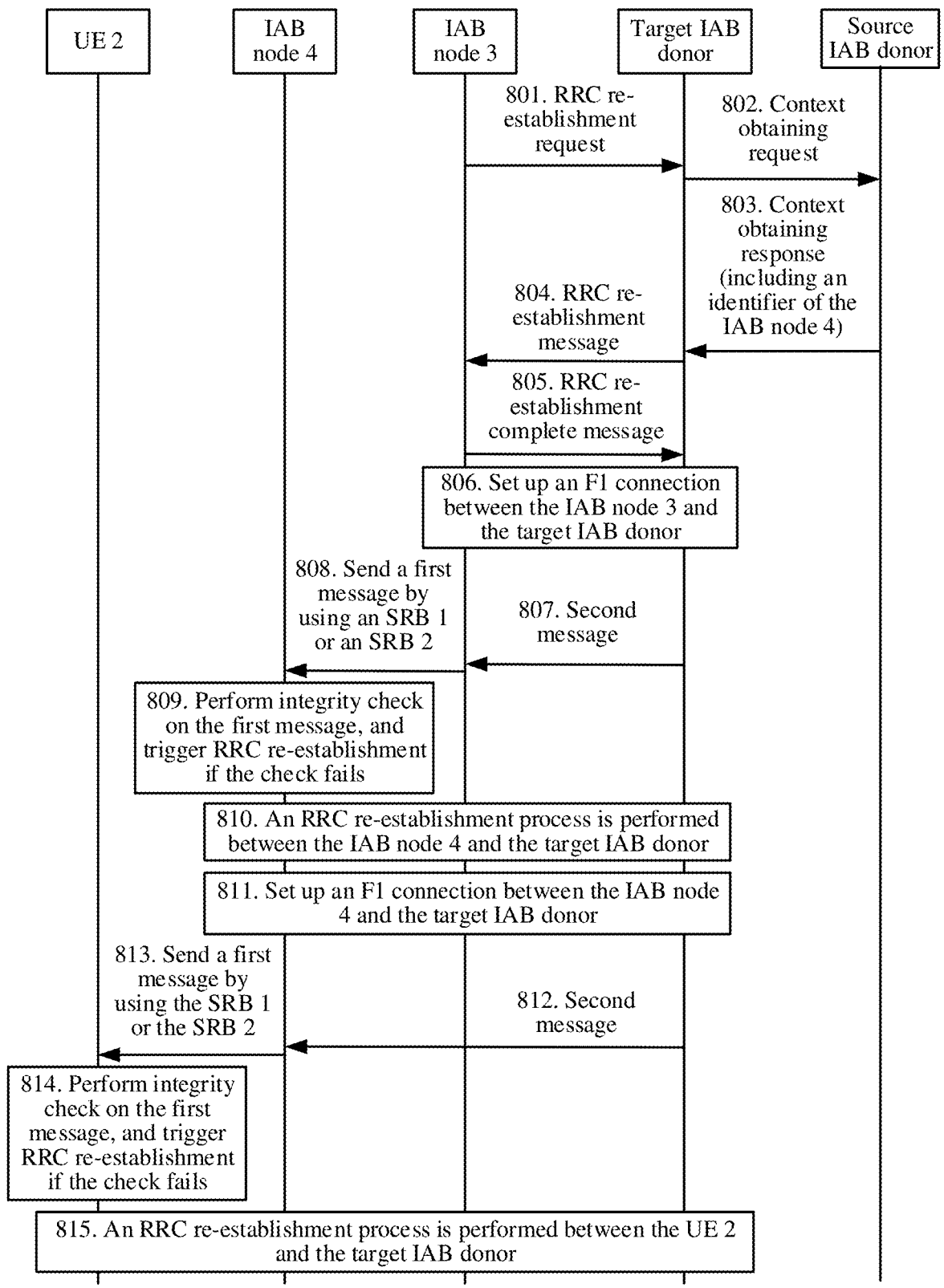
FIG. 8 is another schematic flowchart of an RLF recovery method for an IAB network according to an embodiment.

In this embodiment, the target IAB donor may centrally manage the RLF recovery (where the target IAB donor sends a second message to a descendent node of the target IAB donor, where the second message carries an RRC message), or the RLF recovery may be performed through distributed management (where a descendent node of the target IAB donor performs RLF recovery based on prompt information of the target IAB donor). The descendent node of the target IAB donor is a node connected to the IAB donor over a one-hop or multi-hop wireless link (where the node may be an IAB node or a UE). A node connected to the IAB donor over the one-hop wireless link is a node directly connected to the IAB donor. A node connected to the IAB donor over the multi-hop wireless link is a node connected to the IAB donor through at least one intermediate IAB node. For example, in FIG. 7, the IAB node 1, the IAB node 3, the IAB node 4, the UE 1, and the UE 2 are all descendent nodes of the target IAB donor. The following separately provides descriptions. FIG. 8 is another schematic flowchart of an RLF recovery method for an IAB network according to an embodiment. In the schematic flowchart of FIG. 8, RLF recovery is centrally managed by a target IAB donor.

In step 801, an IAB node 3 sends an RRC re-establishment request to the target IAB donor.

When the IAB node 3 detects that a radio link failure occurs on a radio link between the IAB node 3 and an old parent node (namely, the IAB node 2 shown in FIG. 7), and attempts to perform link recovery, the IAB node 3 selects a cell served by a new parent node (namely, the IAB node 1 shown in FIG. 7) for access, and an RRC connection re-establishment (RRC connection re-establishment) process is performed between the IAB node 3 and the target IAB donor (which may also be a target IAB-donor-CU or a target IAB-donor-CU-CP) through the IAB node 1. In the RRC connection re-establishment process, the IAB node 3 first sends the RRC re-establishment request to the target IAB donor.

Alternatively, optionally, the IAB node 3 may autonomously choose to be disconnected from a source IAB donor and connected to the target IAB donor. For example, the IAB node 3 may determine, based on a measurement result, that signal quality of a currently connected cell (a cell served by the IAB node 2) is less than a preset threshold T1, and signal quality of another surrounding cell (a cell served by the IAB node 1) is greater than a preset threshold T2; or that signal quality of a cell (a cell served by the IAB node 2) to which the IAB node 3 is currently connected is lower than signal quality of another surrounding cell (a cell served by the IAB node 1), and a difference is greater than or equal to a preset threshold T3. The IAB node 3 may be disconnected from the currently connected cell and connected to a new cell (namely, the cell served by the IAB node 1). Signal quality of a cell may be, for example, an RSRP of the cell, an RSRQ of the cell, or a measured SINR.

Alternatively, optionally, conditional handover may be configured for the IAB node 3. For example, when the IAB node 3 is connected to a source IAB donor, the IAB node 3 obtains, in advance, configuration information related to the conditional handover, where the configuration information includes a necessary configuration (for example, configuration information that is generated by the target IAB donor and that is required for the IAB node 3 to be handed over to the target IAB donor) required for setting up a connection to the target IAB donor. A preset condition for triggering the conditional handover is further configured for the IAB node 3. When the preset condition is met, the IAB node 3 performs a handover process based on the necessary configuration that is obtained in advance and that is required for setting up the connection to the target IAB donor and sets up the connection to the target IAB donor. The preset condition may be: Signal quality of a currently connected cell is less than a preset threshold T1, and signal quality of a candidate cell is greater than a preset threshold T2. Alternatively, signal quality of a cell to which the IAB node 3 is currently connected is lower than signal quality of a candidate cell, and a difference is greater than or equal to a preset threshold T3. Alternatively, when an RLF or a handover failure occurs, the IAB node 3 selects a new cell served by a parent node connected to the target IAB donor for access, where the new cell is one of candidate cells included in the configuration information that is obtained in advance and that is related to the conditional handover. In this case, the IAB node 3 attempts to perform conditional handover to be connected to the target IAB donor. For more preset conditions related to the conditional handover, refer to a conventional technology. Details are not described herein.

Alternatively, in another possible embodiment, when a handover failure or a conditional handover failure occurs on the IAB node 3, the IAB node 3 needs to perform an RRC re-establishment process, and a new to-be-accessed cell that is selected is a cell served by a parent node connected to the target IAB donor. After performing the RRC re-establishment process, the IAB node 3 is connected to the target IAB donor through the parent node.

In this embodiment, an implementation scenario in which the IAB node 3 may autonomously choose to be disconnected from the source IAB donor and connected to the target IAB donor is not limited. After determining to be connected to the target IAB donor, the IAB node initiates the RRC re-establishment request to the target IAB donor. For a process, refer to the following RLF recovery process performed by the IAB node. In a process in which the IAB node 3 performs the RLF recovery, if the IAB node 3 selects the cell served by the new parent node (the IAB node 1) for access, the IAB node 3 may determine, by using an identifier of the new to-be-accessed cell, whether the newly accessed parent node is connected to a new target IAB donor. The IAB node 3 may perform determining based on the cell identifier included in system information of the to-be-accessed cell. This is because the cell identifier (for example, an NR cell identifier (NCI) of the cell) includes an identifier of a base station gNB, and different IAB donor network devices correspond to different gNB identifiers. Therefore, after obtaining the system information of the to-be-accessed cell, the IAB node 3 may determine, based on the gNB identifier that is in the identifier of the to-be-accessed cell and that is carried in the system information, whether the IAB node 3 is connected to the new IAB donor after performing the RLF recovery. The system information may also be referred to as a first message. Therefore, after determining that the IAB node 3 is connected to the descendent cell of the target IAB donor, the IAB node 3 may send the RRC re-establishment request to the new IAB donor (namely, the target IAB donor which may be the target IAB-donor-CU or the target IAB-donor-CU-CP) through the new parent node (namely, the IAB node 1), to request to set up the first RRC connection to the target IAB donor. Optionally, the IAB node 3 may further send, to the new IAB donor (namely, the target IAB donor which may be the target IAB-donor-CU or the target IAB-donor-CU-CP), an RRC message that carries information for requesting an IP address. The RRC message may include information about a quantity and a type (where the type may be, for example, an IPv4 address, an IPv6 address, or an IPv6 address prefix) of IP addresses for different purposes. The purposes of the IP addresses may be any one of the following: transmitting an F1 interface control plane message (namely, an F1-C service), transmitting an F1 interface user plane message (namely, an F1-U service), transmitting a non-F1 interface message (namely, a non-F1 service), or transmitting all services.

It should be understood that, in this embodiment, a node on which a radio link failure occurs is an IAB node. During actual application, a node on which a radio link failure occurs may alternatively be a UE. The UE may serve as a relay node to provide a network connection service for another UE (which may be considered as a descendent UE).

It should be understood that, in an application scenario described in this embodiment, the IAB node 3 that performs the recovery is connected to the IAB donor through a parent node 1 or 2. However, in an actual application scenario, the IAB node 3 that performs the recovery may not perform connection through a parent node, but is directly connected to a cell served by a donor node (which may be an IAB donor DU, namely, an IAB-donor-DU, or an IAB donor that has complete functions and on which CU-DU split deployment is not performed). This is not limited. In the flowchart of FIG. 8, with reference to the schematic diagram of the scenario shown in FIG. 7, the IAB node 3 needs to send the RRC re-establishment request to the target IAB donor through the IAB node 1. For simple description, the IAB node 1 is omitted in the flowchart of FIG. 8 and related descriptions.

In step 802, the target IAB donor sends a context obtaining request to the source IAB donor.

After receiving the RRC re-establishment request sent by the first IAB node, the target IAB donor sends the context obtaining request to the source IAB donor, to obtain context information of the IAB node 3.

In step 803, the source IAB donor sends a context obtaining response to the target IAB donor.

The source IAB donor sends context information (including an identifier of an IAB node 4) of an MT of the IAB node 3 to the target IAB donor through an Xn interface. In addition, the source IAB donor may further include, in the context obtaining response, information about a descendent IAB node/descendent UE originally served by the IAB node 3, where the information may include one or more of the following content: an identifier of the descendent IAB node/descendent UE (for example, the identifier of the IAB node 4 and/or an identifier of a UE 1), an identifier of a child node of each descendent IAB node, an identifier of a parent node of each descendent IAB node, and an identifier of a cell served by a parent node accessed by each descendent IAB node/descendent UE. The identifier of the cell served by the parent node may be, for example, a physical cell identifier PCI of the cell, an NR cell identifier (NCI), or a global cell identifier (NCGI). The identifier of the descendent IAB node/descendent UE may be an F1AP UE ID (for example, a gNB-CU F1AP UE ID allocated by the IAB donor, or a gNB-DU F1AP UE ID allocated by a parent node (for example, the IAB node 3) accessed by the descendent IAB node/descendent UE) allocated by the descendent IAB node/descendent UE on an F1 interface between the IAB node 3 and the source IAB donor, or may be, for example, a cell radio network temporary identifier (C-RNTI) of the descendent IAB node/descendent UE in the to-be-accessed cell. The target IAB donor may know, based on information about the identifier of the descendent IAB node/descendent UE, a descendent IAB node and a descendent UE of the IAB node 3 that need to trigger RRC re-establishment. Optionally, the source IAB donor may further send a topological connection relationship between the IAB node 3 and the descendent IAB node and the descendent UE to the target IAB donor. In this way, when the target IAB donor sends, to the descendent IAB node/descendent UE in a subsequent step, a second message used to trigger the RRC re-establishment, the second message may be any RRC message, and it may be determined that, after the first RRC connection to an IAB node succeeds and an F1 connection to the IAB node is available, the second message used to trigger the RRC re-establishment may be sent to a child node or a descendent UE of the IAB node.

Optionally, for an IAB node (for example, the IAB node 3, the IAB node 4, or another descendent IAB node of the IAB node 3), in a process of obtaining context information of the IAB node between the source IAB donor and the target IAB donor, context information of a DU of the IAB node further needs to be considered. For example, when the source IAB donor sends, to the target IAB donor, a context obtaining response including context information of an MT of the IAB node, the context obtaining response may further include the context information of the DU of the IAB node. The context obtaining response includes, for example, a gNB DU ID of the IAB node DU, a name of the DU, configuration information of a cell served by the DU, configuration information of an F1 interface between the DU and the source IAB donor, user plane tunnel information carried on the F1 interface, and context information of all UEs served by the DU on the F1 interface. Alternatively, in another possible manner, a message that is sent by the source IAB donor to the target IAB donor and that includes context information of an MT of the IAB node may be different from a message that includes the context information of the DU of the IAB node. For example, before setting up the F1 connection to the IAB node, the target IAB donor may obtain the context information of the DU of the IAB node from the source IAB donor.

In step 804, the target IAB donor sends an RRC re-establishment message to the IAB node 3, to indicate the IAB node 3 to perform RRC re-establishment.

In step 805, the IAB node 3 sends an RRC re-establishment complete message to the target IAB donor, to indicate that corresponding configuration has been successfully completed based on a configuration provided by the target IAB donor in the RRC re-establishment message.

In step 806, setup of an F1 connection between the IAB node 3 and the target IAB donor may be an F1 setup process or F1 connection re-establishment.

In step 807, the target IAB donor sends a second message to the IAB node 3.

After the first RRC connection between the target IAB donor (which may be the MT of the IAB node 3) and the IAB node 3 succeeds, and the F1 interface between the target IAB donor and the DU of the IAB node 3 is available, the target IAB donor sends the second message to the IAB node 3. The second message includes the identifier of the IAB node 4, the RRC message, and an SRB identifier. The SRB identifier includes an identifier of an SRB 1 or an identifier of an SRB 2.

In step 808, the IAB node 3 sends a first message to the IAB node 4 by using the SRB 1 or the SRB 2.

After the IAB node 3 receives the second message sent by the target IAB donor, the IAB node 3 sends the first message to the IAB node 4 based on the identifier of the IAB node 4. The first message is the RRC message in the second message.

If a control plane is to transmit control instructions, a transmission channel needs to be established. A signaling channel established over a radio link between a second node and the IAB node 3 is referred to as a signaling radio bearer (SRB). A layer 3 of a radio interface protocol stack between the second node and the IAB node 3 is an RRC layer. Layer 3 signaling is transmitted on the SRB. The signaling radio bearer may include an SRB 0, the SRB 1, and the SRB 2. The SRB 0 may be used to transmit the RRC message on a logical channel common control channel (CCCH) and may be used to transmit signaling for initial access of the UE. The SRB 1 may be used to transmit the RRC message on a dedicated channel. The SRB 2 may be used to transmit a non-access stratum (NAS) message on a dedicated control channel (DCCH) and may have a lower priority than the SRB 1. The SRB 2 may be configured after a security mode is activated. The NAS message transmitted by using the SRB 2 is included in the RRC message. However, the NAS message does not include any RRC protocol control information and is included in the RRC message only when the RRC message is transmitted. In this case, the RRC message is only a carrier. Once the security mode is activated, integrity protection and encryption are performed according to the packet data convergence protocol (PDCP) on all RRC messages (including some NAS messages or 3GPP messages) transmitted by using the SRB 1 and the SRB 2.

In step 809, the IAB node 4 performs integrity check on the first message, and triggers RRC re-establishment if the check fails.

According to descriptions in step 808, integrity protection and/or encryption processing of the target IAB donor is performed on the first message transmitted by using the SRB 1 and the SRB 2. Before the IAB node 3 sets up the connection to the target IAB donor by performing the RLF recovery process, an IAB donor connected to the IAB node 4 through the IAB node 3 is the source IAB donor. Therefore, before the IAB node 4 (namely, the child node or the descendent UE of the IAB node 3) sets up the second RRC connection to the target IAB donor, a security protection scheme (encryption, integrity protection, and the like) of the IAB node 4 is still a security mechanism (including, for example, an encryption key, an encryption algorithm, an integrity protection key, an integrity protection algorithm, and the like) negotiated with the source IAB donor. Therefore, after the connection between the target IAB donor and the IAB node 3 is set up, because the IAB node 4 does not perceive that the IAB donor is changed, the IAB node 4 still performs integrity protection check on the first message in the original manner (that is, by using the security algorithm and key configured by the source IAB donor, including the integrity protection algorithm and key, and the like configured by the source IAB donor). As a result, integrity check on the first message fails, and the RRC re-establishment process is triggered.

In step 810, the RRC re-establishment process is performed between the IAB node 4 and the target IAB donor.

For descriptions of step 810, refer to the foregoing RRC re-establishment process between the IAB node 3 and the target IAB donor, which is related to content of step 801 to step 805, where the IAB node 3 is replaced with the IAB node 4 for understanding. It should be noted that, if the target IAB donor obtains the context information of the IAB node 4 in step 803, the target IAB donor does not need to send a context obtaining request for the IAB node 4 to the source IAB donor again.

In step 811, setup of an F1 connection between the IAB node 4 and the target IAB donor may be an F1 setup process or an F1 connection re-establishment process.

After the RRC re-establishment is successfully performed between the IAB node 4 and the target IAB donor (where for example, the IAB node 4 successfully sends an RRC re-establishment complete message to the target IAB donor through the IAB node 3), the IAB node 4 may set up the F1 connection to the target IAB donor (where the IAB node 4 may initiate the F1 connection setup process or the F1 connection re-establishment process). It should be noted that, in this embodiment, the F1 connection setup or re-establishment process between the IAB node and the target IAB donor may further include the following process (although not shown in the figure): an SCTP association between the two nodes which is also referred to as a transport network layer association (TNL association) setup process, a security negotiation process related to internet protocol security (IPsec) of the F1 interface, and the like.

In step 812, the target IAB donor sends a second message to a UE 2.

After the second RRC connection between the target IAB donor and IAB node 4 (which may be the MT of the IAB node 4) succeeds, and the F1 interface between the target IAB donor and the DU of the IAB node 4 is available, the target IAB donor sends the second message to the IAB node 4. The second message includes an identifier of the UE 2, the RRC message, and the SRB identifier. The SRB identifier includes the identifier of the SRB 1 or the identifier of the SRB 2.

In step 813, the IAB node 4 sends a first message to the UE 2 by using the SRB 1 or the SRB 2.

After the IAB node 4 receives the second message sent by the target IAB donor, the IAB node 4 sends the first message to the UE 2 based on the identifier of the UE 2. The first message is the RRC message in the second message.

In step 814, the UE 2 performs integrity check on the first message, and triggers RRC re-establishment if the check fails.

In step 815, an RRC re-establishment process is performed between the UE 2 and the target IAB donor.

For related descriptions of step 812 to step 815, refer to related descriptions of step 807 to step 810 for understanding. It should be noted that, if the target IAB donor obtains context information of the UE 2 in step 803, the target IAB donor may not need to send a context obtaining request for the UE 2 to the source IAB donor again.

In the foregoing solutions, when obtaining the context information of the first IAB node that performs the RRC re-establishment, the target IAB donor needs to learn of the identifier of the child node or the descendent UE (namely, the identifier of the second node) of the first IAB node. Then, after the first RRC connection between the first IAB node and the target IAB donor is successfully set up, and the F1 connection between the first IAB node and the target IAB donor is available, any RRC message carried on the SRB 1 or the SRB 2 is sent to the second node through the first IAB node. In this way, the second node is triggered to perform the RRC connection re-establishment process, so that the second RRC connection between the second node and the target IAB donor is set up.

According to the embodiments, after the RLF occurs on the IAB node, if the IAB node is connected to the new IAB donor after performing the RLF recovery, the second node served by the IAB node can also trigger the RRC re-establishment. This can avoid a problem that the second node cannot continue service data and signaling transmission because the second node does not perceive that the IAB donor is changed. When this solution is used, the second node may be a UE, or may be an IAB node. Therefore, some scenarios in which the UE cannot perform RRC re-establishment based on signaling of the IAB node may be compatible.

Figure 9A:
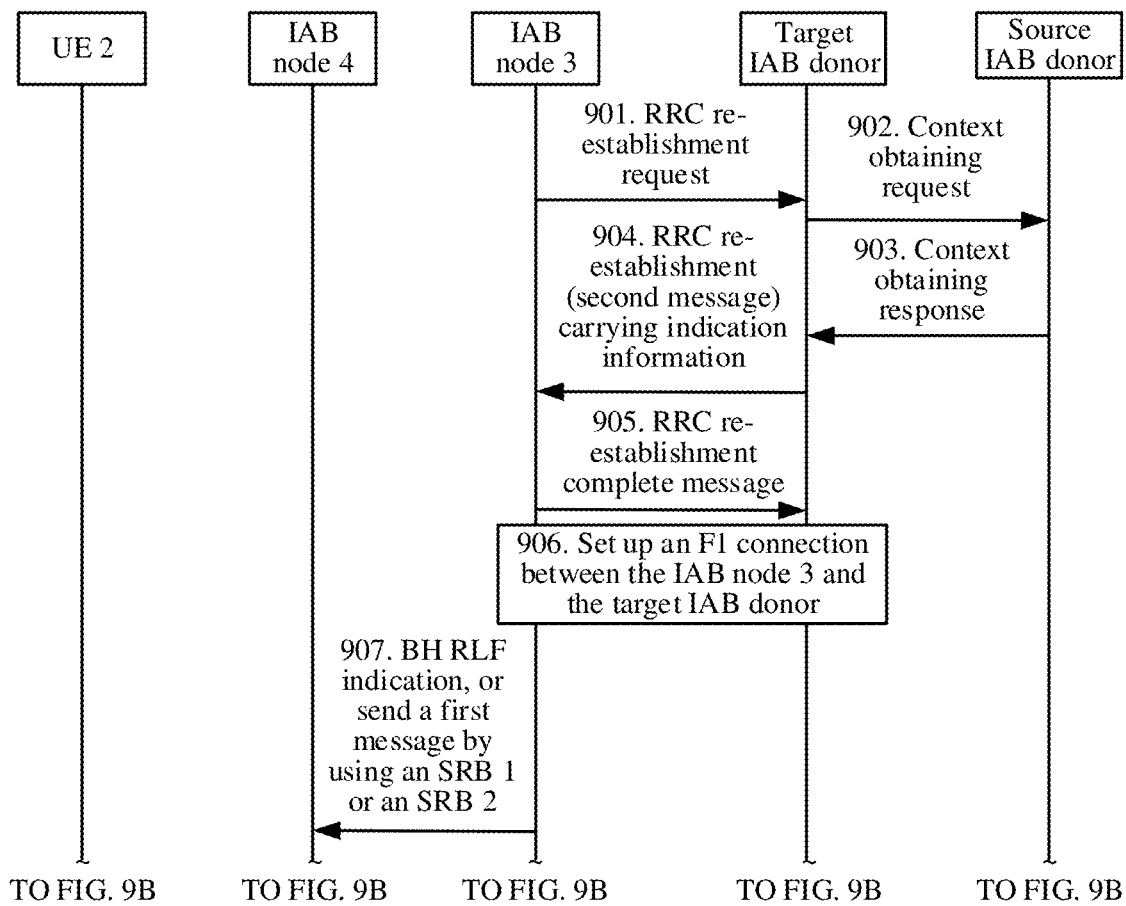
FIG. 9A and FIG. 9B are another schematic flowchart of an RLF recovery method for an IAB network according to an embodiment.
Figure 9B:
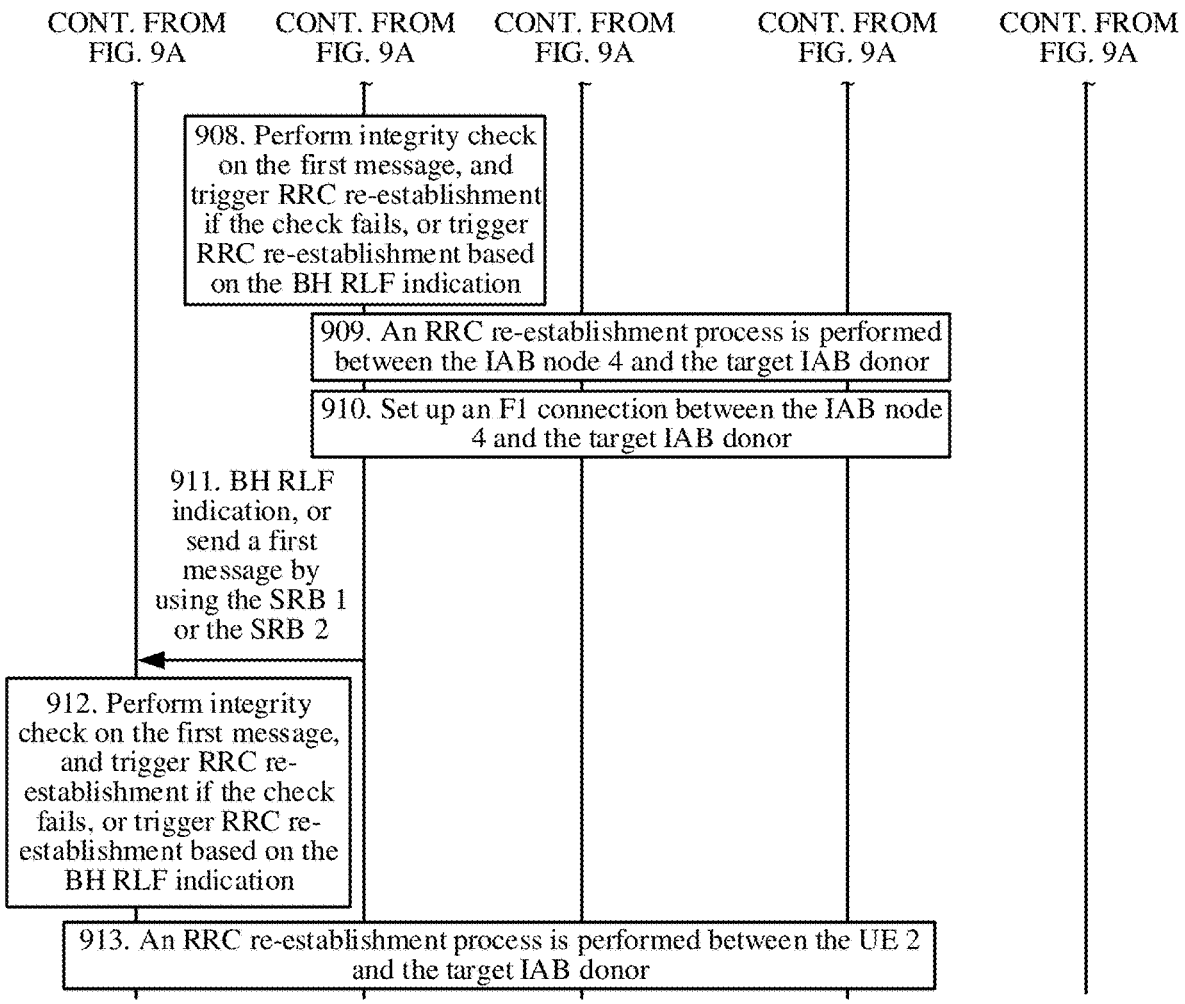

The foregoing describes a solution in which the target IAB donor centrally manages the RLF recovery, and the following describes a solution in which the RLF recovery is performed through distributed management. FIG. 9A and FIG. 9B are another schematic flowchart of an RLF recovery method for an IAB network according to an embodiment.

In step 901, an IAB node 3 sends an RRC re-establishment request to a target IAB donor.

In step 902, the target IAB donor sends a context obtaining request (for example, a RETRIEVE UE CONTEXT REQUEST message) to a source IAB donor.

In step 903, the source IAB donor sends a context obtaining response (for example, a RETRIEVE UE CONTEXT RESPONSE message) to the target IAB donor.

In a possible manner, in step 903, the source IAB donor sends context information (including an identifier of an IAB node 4) of an MT of the IAB node 3 to the target IAB donor through an Xn interface. In addition, the source IAB donor may further include, in the context obtaining response, information about a descendent IAB node/descendent UE originally served by the IAB node 3, where the information may include one or more of the following content: an identifier of the descendent IAB node/descendent UE, an identifier of a child node of each descendent IAB node, an identifier of a parent node of each descendent IAB node, and an identifier of a cell served by a parent node accessed by each descendent IAB node/descendent UE (for example, a PCI of the cell, an NCI of the cell, or an NCGI). The identifier of the descendent IAB node/descendent UE may be an F1AP UE ID (for example, a gNB-CU F1AP UE ID allocated by the IAB donor, or a gNB-DU F1AP UE ID allocated by a parent node (for example, the IAB node 3) accessed by the descendent IAB node/descendent UE) allocated by the descendent IAB node/descendent UE on an F1 interface between the IAB node 3 and the source IAB donor, or may be, for example, a C-RNTI of the descendent IAB node/descendent UE in the to-be-accessed cell. The target IAB donor may know, based on information about the identifier of the descendent IAB node/descendent UE, a descendent IAB node and a descendent UE of the IAB node 3 that need to trigger RRC re-establishment. Optionally, the source IAB donor may further send a topological connection relationship between the IAB node 3 and the descendent IAB node and the descendent UE to the target IAB donor. In this way, when the target IAB donor sends, to the descendent IAB node/descendent UE in a subsequent step, a second message used to trigger the RRC re-establishment, the second message may be any RRC message, and it may be determined that, after the first RRC connection to an IAB node succeeds and an F1 connection to the IAB node is available, the second message used to trigger the RRC re-establishment may be sent to a child node or a UE of the IAB node.

For an IAB node (for example, the IAB node 3, the IAB node 4, or another descendent IAB node of the IAB node 3), in a process of obtaining context information of the IAB node between the source IAB donor and the target IAB donor, context information of a DU of the IAB node further needs to be considered. Optionally, for example, when the source IAB donor sends, to the target IAB donor, a message including context information of an MT of the IAB node, the message may further include the context information of the DU of the IAB node. The message may include, for example, a gNB DU ID of the IAB node DU, a name of the DU, configuration information of a cell served by the DU, configuration information of an F1 interface between the DU and the source IAB donor, user plane tunnel information carried on the F1 interface, and context information of all UEs served by the DU on the F1 interface. Alternatively, in another possible manner, a message that is sent by the source IAB donor to the target IAB donor and that includes context information of an MT of the IAB node may be different from a message that includes the context information of the DU of the IAB node. For example, before setting up the F1 connection to the IAB node, the target IAB donor may obtain the context information of the DU of the IAB node from the source IAB donor.

In step 904, the target IAB donor sends an RRC re-establishment (RRCReestablishment) message or an RRC setup (RRCSetup) message to the IAB node 3.

The RRC re-establishment message is also referred to as a second message and may include first indication information. The first indication information indicates that the RRC re-establishment performed by the first IAB node is RRC re-establishment across IAB donors.

In step 905, the IAB node 3 sends an RRC re-establishment complete (RRCReestablishmentComplete) message or an RRC setup complete (RRCSetupComplete) message to the target IAB donor.

In step 906, setup of an F1 connection between the IAB node 3 and the target IAB donor may be an F1 setup process or an F1 connection re-establishment process.

In step 907, the IAB node 3 sends second indication information to the IAB node 4, where the second indication information indicates that a radio link failure occurs on the first IAB node, or that an RLF recovery process is performed but the recovery fails (where the second indication information may be, for example, a BH RLF indication); or sends a first message to the IAB node 4 by using an SRB 1 or an SRB 2.

The IAB node 3 perceives, based on the first indication information in the RRC re-establishment message, that the RRC re-establishment performed by the IAB node 3 is RRC re-establishment across IAB donors. Therefore, the IAB node 3 learns that the child node or the descendent UE of the IAB node 3 also need to perform RRC re-establishment. Therefore, the IAB node 3 sends the BH RLF indication to the IAB node 4, or sends the first message to the IAB node 4 by using the SRB 1 or the SRB 2 (where the first message is sent to an MT of the IAB node 4 by using the SRB 1 or the SRB 2 of the MT of the IAB node 4). The first message may be any RRC message generated by the IAB node 3, or any data packet generated by the IAB node 3.

In step 908, the IAB node 4 performs integrity check on the first message, and triggers RRC re-establishment after the check fails, or triggers RRC re-establishment based on the received second indication information (for example, the BH RLF indication).

Before the IAB node 3 sets up the connection to the target IAB donor by performing the RLF recovery process, an IAB donor connected to the IAB node 4 through the IAB node 3 is the source IAB donor. Therefore, before the IAB node 4 sets up the second RRC connection to the target IAB donor, a security protection scheme (encryption, integrity protection, and the like) of the IAB node 4 is still a security mechanism (including, for example, an encryption key, an encryption algorithm, an integrity protection key, an integrity protection algorithm, and the like) negotiated with the source IAB donor. Therefore, after the connection between the target IAB donor and the IAB node 3 is set up, because the IAB node 4 does not perceive that the IAB donor is changed, the IAB node 4 still performs integrity protection check on the first message in the original manner (that is, by using the security algorithm and key configured by the source IAB donor, including the integrity protection algorithm and key, and the like configured by the source IAB donor). As a result, integrity check on the first message fails, and the RRC re-establishment process is triggered.

In step 909, the RRC re-establishment process is performed between the IAB node 4 and the target IAB donor.

For descriptions, refer to the foregoing RRC re-establishment process between the IAB node 3 and the target IAB donor, which is related content of step 901 to step 905. It should be noted that, if the target IAB donor obtains context information of the IAB node 4 in step 903, the target IAB donor may not need to send a context obtaining request message for the IAB node 4 to the source IAB donor again.

In step 910, setup of an F1 connection between the IAB node 4 and the target IAB donor may be an F1 setup process or an F1 connection re-establishment process.

In step 911, the IAB node 4 sends a first message to a UE 2 by using the SRB 1 or the SRB 2.

After the IAB node 4 receives the second message sent by the target IAB donor, the IAB node 4 sends the first message to the UE 2. The first message may be any RRC message generated by the IAB node 4, or any data packet generated by the IAB node 4, and the first message may be different from the first message in step 907.

In step 912, the UE 2 performs integrity check on the first message, and triggers RRC re-establishment if the check fails.

In step 913, an RRC re-establishment process is performed between the UE 2 and the target IAB donor.

For related descriptions of step 911 to step 913, refer to related descriptions of step 907 to step 909.

For related descriptions of some steps in FIG. 9A and FIG. 9B, refer to descriptions in FIG. 8 for understanding. For example, for step 901, refer to descriptions of step 801 for understanding. For step 908, refer to descriptions of step 809 for understanding.

In this embodiment, after being connected to the new IAB donor, the first IAB node perceives, based on the first indication information of the target IAB donor, that the RRC re-establishment performed by the first IAB node is RRC re-establishment across IAB donors; and sends the second indication information to a second node, or send the first message to the second node by using the SRB 1 or the SRB 2, to trigger an RRC re-establishment process of the second node, so that the second node sets up the second RRC connection to the target IAB donor.

The same effect as that in FIG. 8 can be achieved through the solutions described in FIG. 9A and FIG. 9B. In addition, the first indication information is carried in the RRC re-establishment message, so that signaling transmission between the target IAB donor and the first IAB node can be reduced, and consumption of network transmission resources can be reduced. In addition, after the signaling transmission is reduced, the RRC re-establishment process of the second node can be triggered more quickly, so that impact of the RLF is reduced, and user experience is improved.

Figure 10:
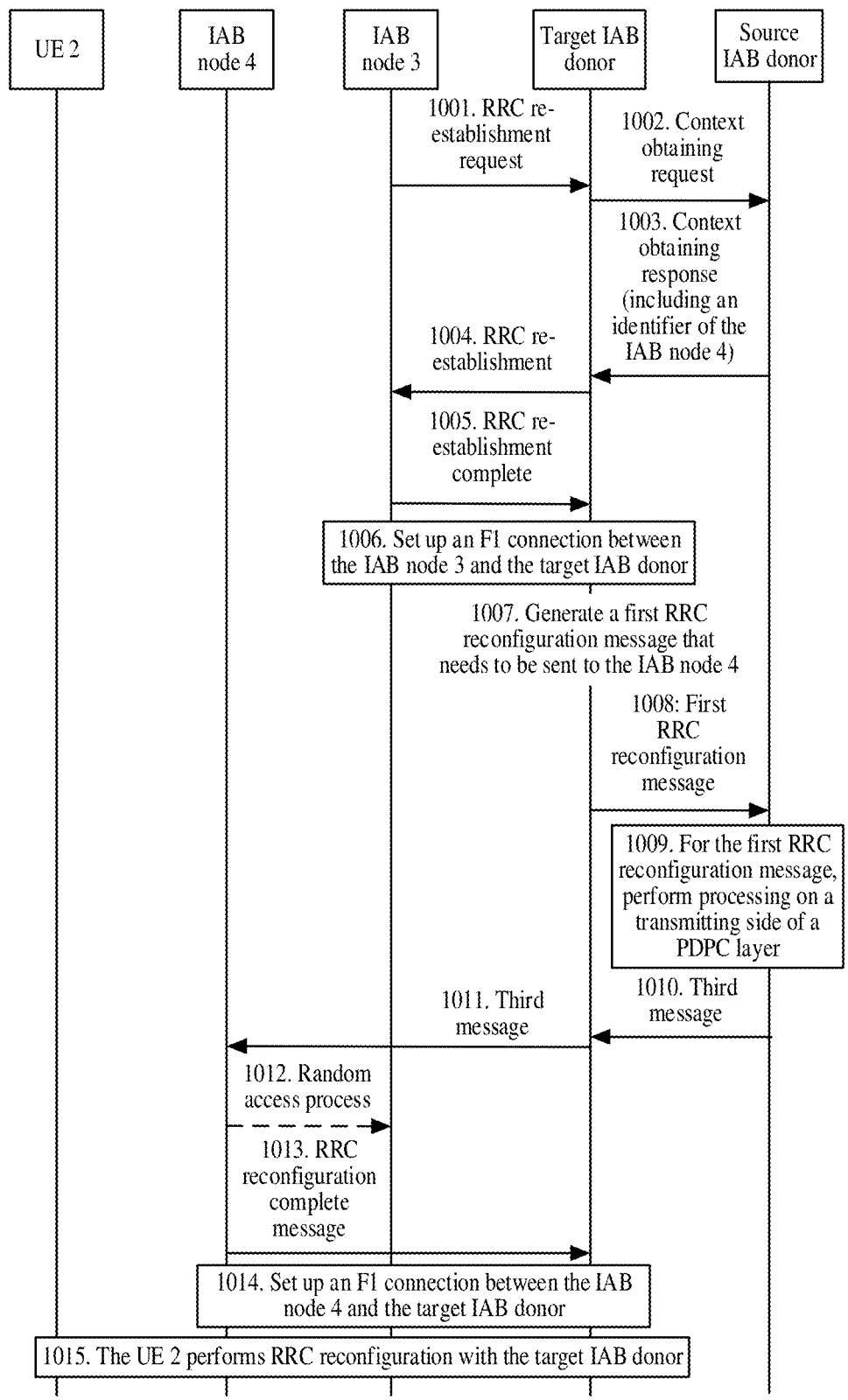
FIG. 10 is another schematic flowchart of an RLF recovery method for an IAB network according to an embodiment.

In FIG. 8, FIG. 9A, and FIG. 9B, the second node needs to perform the RRC re-establishment process. The RRC re-establishment process increases time for the second node to be disconnected from the network. In addition, from the perspective of the second node, the RRC re-establishment is performed after the connection between the second node and the network is abnormal. As a result, user experience is poor. The embodiments may provide another RLF recovery method for an IAB network. According to the method, the time for the RRC re-establishment can be reduced, so that impact of the RLF on the UE or the IAB node is reduced, and user experience is improved. FIG. 10 is another schematic flowchart of an RLF recovery method for an IAB network according to an embodiment.

In step 1001, an IAB node 3 sends an RRC re-establishment request to a target IAB donor.

In step 1002, the target IAB donor sends a context obtaining request to a source IAB donor.

In step 1003, the source IAB donor sends a context obtaining response to the target IAB donor.

In step 1004, the target IAB donor sends an RRC re-establishment message to the IAB node 3.

The RRC re-establishment message is also referred to as a second message and includes indication information. The indication information indicates that RRC re-establishment performed by the first IAB node is RRC re-establishment across IAB donors.

In step 1005, the IAB node 3 sends an RRC re-establishment complete message to the target IAB donor.

In step 1006, setup of an F1 connection between the IAB node 3 and the target IAB donor may be an F1 setup process or F1 connection re-establishment.

For details of step 1001 to step 1006, refer to descriptions of steps 801 to 806 for understanding.

In step 1007, the target IAB donor generates a first RRC reconfiguration message that needs to be sent to an IAB node 4.

In step 1008, the target IAB donor sends the first RRC reconfiguration message to the source IAB donor.

In step 1009, for the first RRC reconfiguration message, the source IAB donor performs processing on a transmitting side of a PDCP layer, where the processing may include any one or more of the following: encryption, integrity protection, PDCP header information addition, header compression, or the like.

The PDCP layer is a sub-protocol layer of a radio interface protocol stack and processes a radio resource management (RRC) message on a control plane and an upper layer data packet (for example, an internet protocol (IP) packet) on a user plane. On the user plane, after a PDCP sublayer obtains an IP data packet from an upper layer, the PDCP sublayer performs header compression and encryption on the IP data packet, and then submits the IP data packet to an RLC sublayer. The PDCP sublayer further provides a sequential submission function and a duplicate packet detection function to the upper layer. On the control plane, the PDCP sublayer provides a signaling transmission service for upper-layer RRC. In addition, the PDCP sublayer implements encryption and integrity protection for RRC signaling on the transmitting side and implements decryption and integrity check for RRC signaling in a reverse direction (on a receiving side). Before the first IAB node (for example, the IAB node 3) sets up the connection to the target IAB donor by performing an RLF recovery process, an IAB donor connected to a second node through the first IAB node is the source IAB donor. Therefore, before the second node (namely, a child node or a descendent UE of the first IAB node, for example, the IAB node 4) sets up the second RRC connection to the target IAB donor, a security protection scheme (encryption, integrity protection, and the like) of the second node is still a security mechanism (including, for example, an encryption key, an encryption algorithm, an integrity protection key, an integrity protection algorithm, and the like) negotiated with the source IAB donor. Therefore, if the target IAB donor directly sends the first RRC reconfiguration message to the second node after setting up the connection to the first IAB node, and the target IAB donor performs encryption and integrity protection processing on the first RRC reconfiguration message, integrity protection check performed by the second node on the first RRC reconfiguration message may fail, and the first RRC reconfiguration message cannot be correctly decrypted. Therefore, after generating the first RRC reconfiguration message, the target IAB donor may first send the first RRC reconfiguration message to the source IAB donor through an Xn interface and include an identifier of the second node (for example, the IAB node 4) in the Xn interface. Then, the source IAB donor performs PDCP layer encryption and integrity protection on the first RRC reconfiguration message in an encryption manner (including an encryption algorithm and a key) and an integrity protection manner (including an integrity protection algorithm and a key) used by the source IAB donor to communicate with the second node, and then transmits, to the target IAB donor, a PDU of the PDCP encapsulated with the first RRC reconfiguration message, where the PDU is also referred to as a third message.

In step 1010, the source IAB donor sends the third message to the target IAB donor.

In step 1011, the target IAB donor sends the third message to the IAB node 4.

The target IAB donor may send the third message to the IAB node 4 through the IAB node 3. The third message includes the first RRC reconfiguration message, and the first RRC reconfiguration message may include a handover command sent to the IAB node 4. The third message may include a synchronization reconfiguration (Reconfigurationwith-Sync) IE (which may be considered as the handover command), and may further include content related to PDCP layer security configurations of SRBs/DRBs of the second node and the target IAB donor. Based on the third message, the second node (JAB node 4) may perform a handover procedure, and then use an updated configuration corresponding to the target IAB donor.

The third message may be included by the target IAB donor in an F1AP message sent to the IAB node 3. The F1AP message may be a UE-associated F1AP message, and include the identifier, used to identify the IAB node 4, on the F1 interface between the IAB node 3 and the target IAB donor. For example, the IAB node 3 allocates a gNB-DU F1AP UE ID to the IAB node 4, or the target IAB donor allocates a gNB-CU F1AP UE ID to the IAB node 4.

Then, the IAB node 3 sends, to the IAB node 4, the third message encapsulated with the first RRC reconfiguration message.

In step 1012, the IAB node 4 performs a random access process in a designated target cell based on information related the handover command included in the first RRC reconfiguration message.

In a possible manner, the first RRC reconfiguration message sent by the target IAB donor to the IAB node 4 further includes a random access-free indication (where for example, the random access-free indication is included in the synchronization reconfiguration IE, or the random access-free indication is included in the first RRC reconfiguration message through an independent IE, but is not included in the synchronization reconfiguration IE). In this case, the IAB node 4 may not need to perform the random access process in step 1012. On the contrary, if the first RRC reconfiguration message includes the synchronization reconfiguration IE, but does not include a random access-free indication, the IAB node 4 may perform step 1012 to perform random access again in a target cell (for example, a cell served by a DU of the IAB node 3 after the IAB node 3 is connected to the target IAB donor).

In step 1013, the IAB node 4 sends an RRC reconfiguration complete message to the target IAB donor.

The IAB node 4 may send the RRC reconfiguration complete message to the target IAB donor through the IAB node 3. The RRC reconfiguration complete message may be encapsulated by the IAB node 3 in the F1AP message and sent to the target IAB donor. The F1AP message may include the identifier, used to identify the IAB node 4, on the F1 interface between the IAB node 3 and the target IAB donor. For example, the IAB node 3 allocates the gNB-DU F1AP UE ID to the IAB node 4, or the target IAB donor allocates the gNB-CU F1AP UE ID to the IAB node 4.

In step 1014, setup of an F1 connection between the IAB node 4 and the target IAB donor may be an F1 setup process or F1 connection re-establishment.

In step 1015, a UE 2 performs RRC reconfiguration with the target IAB donor.

For the UE 2 served by the IAB node 4, the target IAB donor may also generate an RRC reconfiguration message for the UE 2, so that the UE 2 performs handover and updates configuration content of the UE 2. For a process, refer to step 1007 to step 1013 of the IAB node 4 for understanding. It should be noted that an RRC reconfiguration message sent by the target IAB donor to a UE of a conventional old version may not need to carry a random access-free indication. In this case, the UE may perform a random access process similar to that in step 1012 in a target cell (for example, a cell served by a DU of the IAB node 4 after the IAB node 4 is connected to the target IAB donor) specified by a handover command carried in the received RRC reconfiguration message.

For related descriptions of some steps in FIG. 10, refer to related descriptions in FIG. 8. For example, for step 1001, refer to descriptions of step 801 for understanding. For step 1014, refer to descriptions of step 811 for understanding.

In this embodiment, after the first IAB node sets up the first RRC connection to the target IAB donor by performing the RLF recovery, the target IAB donor sends the third message to the second node. In this way, time for recovering the second RRC connection between the second node and the target IAB donor can be reduced, and the second node does not consider that the connection to the network is abnormal, so that impact, on the descendent node, of the RLF on the first IAB node is reduced, and user experience is improved. In addition, the solutions in this embodiment may be compatible with a UE of a legacy version.

Figure 11:
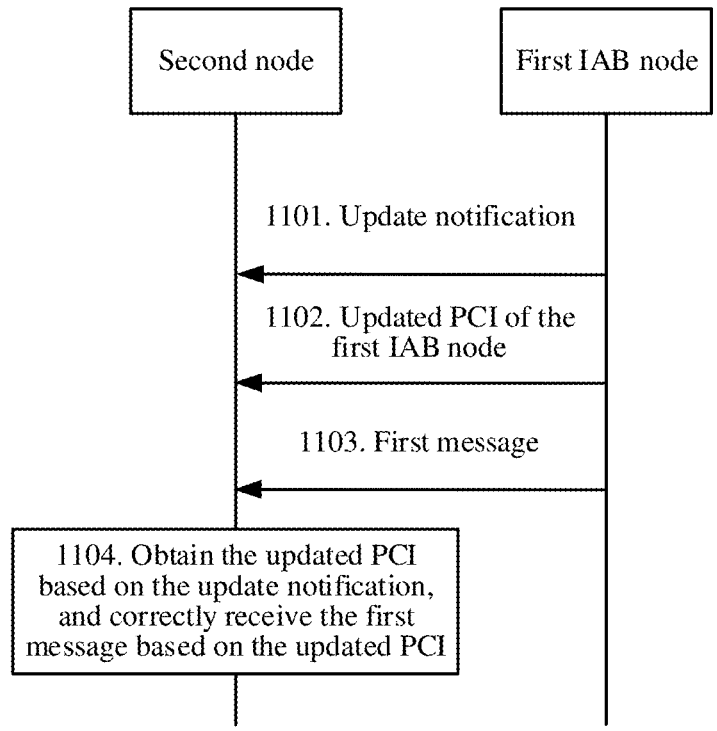
FIG. 11 is a schematic flowchart of a PCI update method according to an embodiment.

In embodiments corresponding to FIG. 8, FIG. 9A and FIG. 9B, and FIG. 10, because the first IAB node changes the IAB donor, the PCI of the first IAB node may change. If the PCI of the first IAB node changes, the second node may not correctly receive the first message or the second indication information in FIG. 8 or FIG. 9A and FIG. 9B, or the third message in FIG. 10. Therefore, the embodiments may further provide a PCI update method. According to the method, the second node can correctly receive the first message, the second indication information, or the third message. The method may be used in combination with any of the foregoing embodiments in FIG. 8, FIG. 9A and FIG. 9B, and FIG. 10. The following describes the method by using the first message as an example. FIG. 11 is a schematic flowchart of a PCI update method according to an embodiment.

In step 1101, a first IAB node sends an update notification to a second node, where the update notification indicates that system information is updated or indicates that a PCI is to be updated.

In step 1102, the first IAB node broadcasts an updated PCI of the first IAB node (where for example, the updated PCI is carried in the system information).

The physical cell identifier PCI is used to distinguish between radio signals of different cells, to ensure that there may be no same physical cell identifier in coverage of related cells. The PCI may be used to scramble a sent first message.

In step 1103, the second node obtains, based on the update notification, the updated PCI broadcast by the first IAB node, and correctly receives the first message based on the updated PCI.

During data transmission in which the PCI is required for scrambling, the first IAB node uses a new PCI as an input parameter for scrambling a codeword. Therefore, when the PCI changes, the second node needs to perceive the change of the PCI. Otherwise, the second node cannot correctly receive the first message sent by the first IAB node. The second node may actively obtain a PCI of a cell only when performing cell search. In this embodiment, before the first IAB node sets up the first RRC connection to a target IAB node by performing RLF recovery, the second node is connected to a source IAB node through the first IAB node. Therefore, if the second node does not perform cell search again, the second node cannot perceive the updated PCI of the first IAB node. Therefore, the second node actively obtains, based on the update notification sent by the first IAB node, the updated PCI broadcast by the first IAB node, and performs receiving processing (for example, descrambling) on the received first message based on the updated PCI, to correctly receive the first message.

Figure 12:
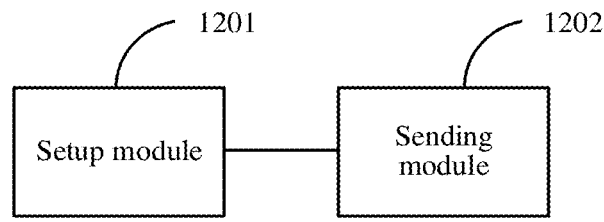
FIG. 12 is a schematic diagram of a structure of an RLF recovery apparatus for an IAB network according to an embodiment.

The foregoing describes the RLF recovery method for the IAB network and the PCI update method in the embodiments. The following describes an RLF recovery apparatus for an IAB network in the embodiments. FIG. 12 is a schematic diagram of a structure of an RLF recovery apparatus for an IAB network according to an embodiment.

The apparatus includes: a setup module 1201, configured to set up a first radio resource control (RRC) connection to a target IAB donor by performing RLF recovery; and a sending module 1202, configured to: after the first IAB node sets up the first RRC connection to the target IAB donor by performing the RLF recovery, send a first message to a second node by using an SRB 1 or an SRB 2, or send a backhaul radio link failure indication BH RLF indication to a second node, where the first message is used to set up the first RRC connection between the second node and the target IAB donor, where before the first IAB node sets up the first RRC connection to the target IAB donor by performing the RLF recovery, the second node is connected to a source IAB donor through the first IAB node, and the second node is a child node or a descendent UE of the first IAB node.

In another embodiment, the apparatus may further include a receiving module, a broadcasting module, or the like. The modules in the apparatus are configured to perform all or some operations that may be performed by the first IAB node 3 in the embodiment corresponding to FIG. 6, FIG. 8, or FIG. 9A and FIG. 9B.

FIG. 12 is a schematic diagram of a structure of an RLF recovery apparatus for an IAB network according to an embodiment.

The apparatus includes: a setup module 1201, configured to set up a first radio resource control (RRC) connection to a target IAB donor by performing RLF recovery; and a sending module 1202, configured to: after the first IAB node sets up the first RRC connection to the target IAB donor by performing the RLF recovery, send a first message to a second node by using a signaling radio bearer SRB 1 or an SRB 2, or send a backhaul radio link failure indication BH RLF indication to a second node, where the first message or the BH RLF indication is used to set up a second RRC connection between the second node and the target IAB donor, where before the first IAB node sets up the first RRC connection to the target IAB donor by performing the RLF recovery, the second node is connected to a source IAB donor through the first IAB node, and the second node is a child node or a descendent UE of the first IAB node.

In another embodiment, the apparatus may further include a receiving module, a broadcasting module, or the like. The modules in the apparatus are configured to perform all or some operations that may be performed by the first IAB node 3 in the embodiment corresponding to FIG. 6, FIG. 8, or FIG. 9A and FIG. 9B.

Figure 13:
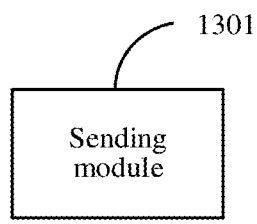
FIG. 13 is another schematic diagram of a structure of an RLF recovery apparatus for an IAB network according to an embodiment.

FIG. 13 is another schematic diagram of a structure of an RLF recovery apparatus for an IAB network according to an embodiment.

The apparatus includes: a sending module 1301, configured to send a second message to a first IAB node, where the second message is used by the first IAB node to send a first message to a second node based on the second message by using a signaling radio bearer SRB 1 or an SRB 2, or used by the first IAB node to send a backhaul radio link failure indication BH RLF indication to a second node, where before the first IAB node sets up the first RRC connection to the target IAB donor by performing RLF recovery, the second node is connected to a source IAB donor through the first IAB node, and the second node is a child node or a descendent UE of the first IAB node.

In another embodiment, the apparatus may further include a receiving module or the like. The modules in the apparatus are configured to perform all or some operations that may be performed by the target IAB donor in the embodiment corresponding to FIG. 6, FIG. 8, or FIG. 9A and FIG. 9B.

Figure 14:
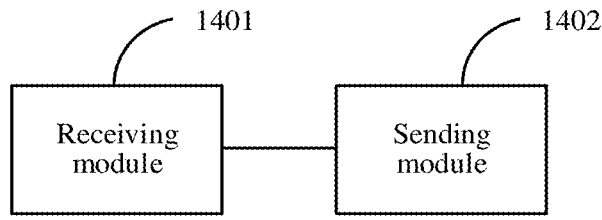
FIG. 14 is another schematic diagram of a structure of an RLF recovery apparatus for an IAB network according to an embodiment.

FIG. 14 is another schematic diagram of a structure of an RLF recovery apparatus for an IAB network according to an embodiment.

The apparatus includes: a receiving module 1401, configured to receive a context obtaining request from a target IAB donor; and a sending module 1402, configured to send a context obtaining response to the target IAB donor, where the context obtaining response includes an identifier of a second node, the identifier of the second node is used by a first IAB node to send a first message to the second node based on the identifier of the second node, and the first message is used by the second node to set up the second RRC connection to the target IAB donor, where before the first IAB node sets up the first RRC connection to the target IAB donor by performing RLF recovery, the second node is connected to the apparatus through the first IAB node, and the second node is a child node or a descendent UE of the first IAB node.

In another embodiment, the modules in the apparatus are configured to perform all or some operations that may be performed by the source IAB donor in the embodiment corresponding to FIG. 8 or FIG. 9A and FIG. 9B.

Figure 15:
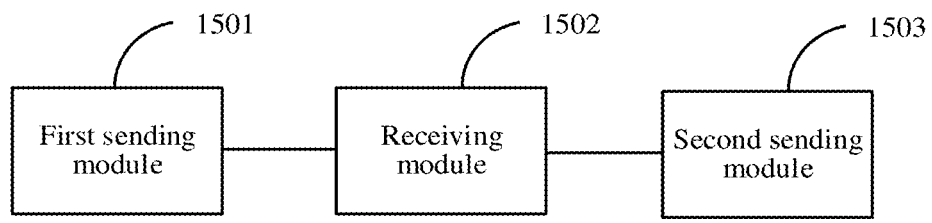
FIG. 15 is a schematic diagram of a structure of an RRC reconfiguration apparatus for an IAB network according to an embodiment.

FIG. 15 is a schematic diagram of a structure of an RRC reconfiguration apparatus for an IAB network according to an embodiment.

The apparatus includes: a first sending module 1501, configured to send a first RRC reconfiguration message to a source IAB donor;

a receiving module 1502, configured to receive a third message from the source IAB donor, where the third message is an RRC reconfiguration message obtained by performing encryption and/or integrity protection on the first RRC reconfiguration message; and a second sending module 1503, configured to send the third message to a second node through a first IAB node, where before the first IAB node sets up the first RRC connection to the target IAB donor by performing RLF recovery, the second node is connected to the source IAB donor through the first IAB node, and the second node is a child node or a descendent UE of the first IAB node.

In another embodiment, the modules in the apparatus are configured to perform all or some operations that may be performed by the target IAB donor in the embodiment corresponding to FIG. 10.

Figure 16:
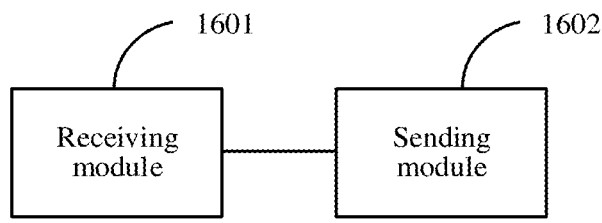
FIG. 16 is another schematic diagram of a structure of an RRC reconfiguration apparatus for an IAB network according to an embodiment.

FIG. 16 is another schematic diagram of a structure of an RRC reconfiguration apparatus for an IAB network according to an embodiment.

The apparatus includes: a receiving module 1601, configured to receive a first RRC reconfiguration message from a target IAB donor; and a sending module 1602, configured to send a third message to the target IAB donor, where the third message is an RRC reconfiguration message obtained by performing encryption and/or integrity protection on the first RRC reconfiguration message, and the third message is used by the target IAB donor to send the third message to a second node through a first IAB node, where before the first IAB node sets up the first RRC connection to the target IAB donor by performing RLF recovery, the second node is connected to the source IAB donor through the first IAB node, and the second node is a child node or a descendent UE of the first IAB node.

In another embodiment, the modules in the apparatus are configured to perform all or some operations that may be performed by the source IAB donor in the embodiment corresponding to FIG. 10.

Figure 17:
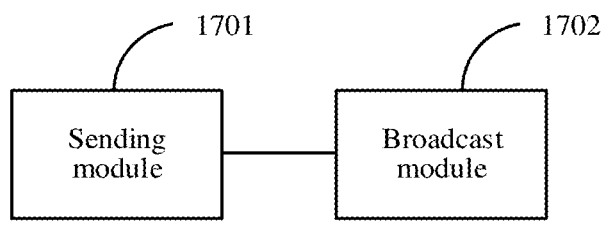
FIG. 17 is a schematic diagram of a structure of a PCI update apparatus according to an embodiment.

FIG. 17 is a schematic diagram of a structure of a PCI update apparatus according to an embodiment.

The apparatus includes: a sending module 1701, configured to send an update notification to a second node; and a broadcasting module 1702, configured to broadcast an updated physical cell identifier PCI of the first IAB node, where the update notification indicates the second node to obtain the updated PCI, and the updated PCI is used by the second node to correctly receive a first message, a BH RLF indication, or a third message.

In another embodiment, the modules in the apparatus are configured to perform all or some operations that may be performed by the first IAB node in the embodiment corresponding to FIG. 6, FIG. 8, FIG. 9A and FIG. 9B, FIG. 10, or FIG. 11.

Figure 18:
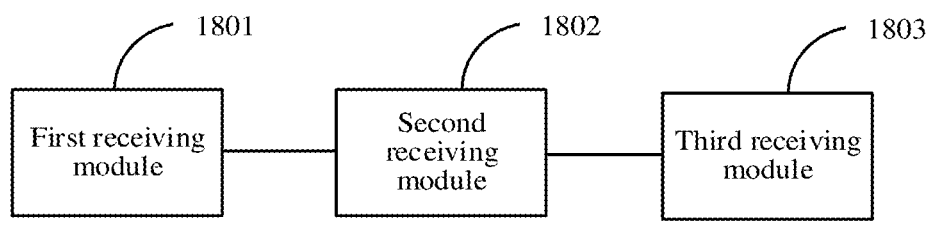
FIG. 18 is another schematic diagram of a structure of a PCI update apparatus according to an embodiment.

FIG. 18 is a schematic diagram of a structure of a PCI update apparatus according to an embodiment.

The apparatus includes: a first receiving module 1801, configured to receive an update notification from a first IAB node;

a second receiving module 1802, configured to receive an updated physical cell identifier PCI of the first IAB node from the first IAB node based on the update notification; and a third receiving module 1803, configured to receive a first message, a BH RLF indication, or a third message based on the updated PCI.

In another embodiment, the modules in the apparatus are configured to perform all or some operations that may be performed by the second node in the embodiment corresponding to FIG. 6, FIG. 8, FIG. 9A and FIG. 9B, FIG. 10, or FIG. 11.

The foregoing describes the RLF recovery apparatus for the IAB network and the PCI update apparatus in the embodiments, and the following describes an RLF recovery device for an IAB network in the embodiments.

Figure 19:
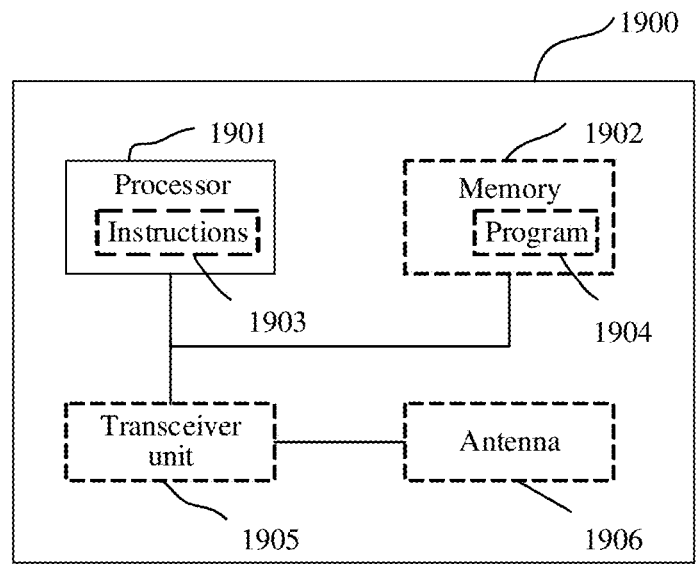
FIG. 19 is a schematic diagram of a structure of a communication apparatus according to an embodiment.

FIG. 19 is a schematic diagram of a structure of a communication apparatus according to an embodiment.

The communication apparatus 1900 includes one or more processors 1901. The one or more processors 1901 may support the communication apparatus 1900 in implementing the communication methods in FIG. 6 to FIG. 10. The processor 1901 may be a general purpose processor or a dedicated processor. For example, the processor 1901 may be a central processing unit (CPU) or a baseband processor. The baseband processor may be configured to process communication data. The CPU may be configured to: control the communication apparatus (for example, a network device, a terminal device, or a chip), execute a software program, and process data of the software program. The communication apparatus 1900 may include one or more memories 1902. The memory 1902 stores a program 1904. The program 1904 may be run by the processor 1901 to generate instructions 1903, to enable the processor 1901 to perform, according to the instructions 1903, the method described in the foregoing method embodiment. Optionally, the memory 1902 may further store data. Optionally, the processor 1901 may further read data stored in the memory 1902. The data and the program 1904 may be stored at a same storage address, or the data and the program 1904 may be stored at different storage addresses.

The processor 1901 and the memory 1902 may be separately disposed, or may be integrated together, for example, integrated on a single board or a system-on-a-chip (SOC).

The device 1900 may further include a transceiver unit 1905, configured to implement signal input (receiving) and output (sending). The transceiver unit 1905 may be referred to as a transceiver or a transceiver circuit. The transceiver unit 1905 may implement signal input (receiving) and output (sending) through the antenna 1906.

In an optional manner, the device 1900 may be configured to implement the method related to the first IAB node described in the foregoing method embodiment, for example, all or some operations that may be performed by the first IAB node in FIG. 6, FIG. 8, FIG. 9A and FIG. 9B, FIG. 10, or FIG. 11. For example, the processor 1901 is configured to set up a first radio resource control (RRC) connection to a target IAB donor by performing RLF recovery. The transceiver unit 1905 is configured to: after the first IAB node sets up the first RRC connection to the target IAB donor by performing the RLF recovery, send a first message to a second node by using an SRB 1 or an SRB 2, or send a backhaul radio link failure indication BH RLF indication to a second node, where the first message is used to set up a second RRC connection between the second node and the target IAB donor, where before the first IAB node sets up the first RRC connection to the target IAB donor by performing the RLF recovery, the second node is connected to a source IAB donor through the first IAB node, and the second node is a child node or a descendent UE of the first IAB node.

In an optional manner, the communication apparatus 1900 may be configured to implement the method related to the target IAB donor node described in the foregoing method embodiment, for example, all or some operations that may be performed by the target IAB donor in FIG. 6, FIG. 8, FIG. 9A and FIG. 9B, or FIG. 10. For example, the transceiver unit 1905 is configured to send a second message to a first IAB node, where the second message is used by the first IAB node to send a first message to a second node based on the second message by using an SRB 1 or an SRB 2, or used by the first IAB node to send a backhaul radio link failure indication BH RLF indication to a second node, where before the first IAB node sets up the first RRC connection to the target IAB donor by performing RLF recovery, the second node is connected to a source IAB donor through the first IAB node, and the second node is a child node or a descendent UE of the first IAB node.

In an optional manner, the communication apparatus 1900 may be configured to implement the method related to the source IAB donor described in the foregoing method embodiment, for example, all or some operations that may be performed by the source IAB donor in FIG. 6, FIG. 8, FIG. 9A and FIG. 9B, or FIG. 10. For example, the transceiver unit 1905 is configured to: receive a context obtaining request from a target IAB donor; and send a context obtaining response to the target IAB donor, where the context obtaining response includes an identifier of a second node, the identifier of the second node is used by a first IAB node to send a first message to the second node based on the identifier of the second node, and the first message or the BH RLF indication is used by the second node to set up the second RRC connection to the target IAB donor, where before the first IAB node sets up the first RRC connection to the target IAB donor by performing RLF recovery, the second node is connected to the apparatus through the first IAB node, and the second node is a child node or a descendent UE of the first IAB node.

In an optional manner, the communication apparatus 1900 may be configured to implement the method related to the second node described in the foregoing method embodiment, for example, all or some operations that may be performed by the second node in FIG. 6, FIG. 8, FIG. 9A and FIG. 9B, FIG. 10, or FIG. 11. For example, the transceiver unit 1905 is configured to: receive an update notification from a first IAB node; receive, based on the update notification, an updated physical cell identifier PCI that is sent by the first IAB node and that is of the first IAB node; and receive a first message, a BH RLF indication, or a third message based on the updated PCI.

The device 1900 may be a chip. For example, the transceiver unit 1905 may be an input circuit and/or an output circuit of the chip, or the transceiver unit 1905 may be a communication interface of the chip, and the chip may be used as a component of a terminal device, a network device, or another wireless communication device.

It should be understood that the steps in the foregoing method embodiments may be completed through a logic circuit in a form of hardware or instructions in a form of software in the processor 1901. The processor 1901 may be a CPU, a digital signal processor (DSP), an application-specific integrated circuit (ASIC), a field programmable gate array (FPGA), or another programmable logic device, for example, a discrete gate, a transistor logic device, or a discrete hardware component.

Figure 20:
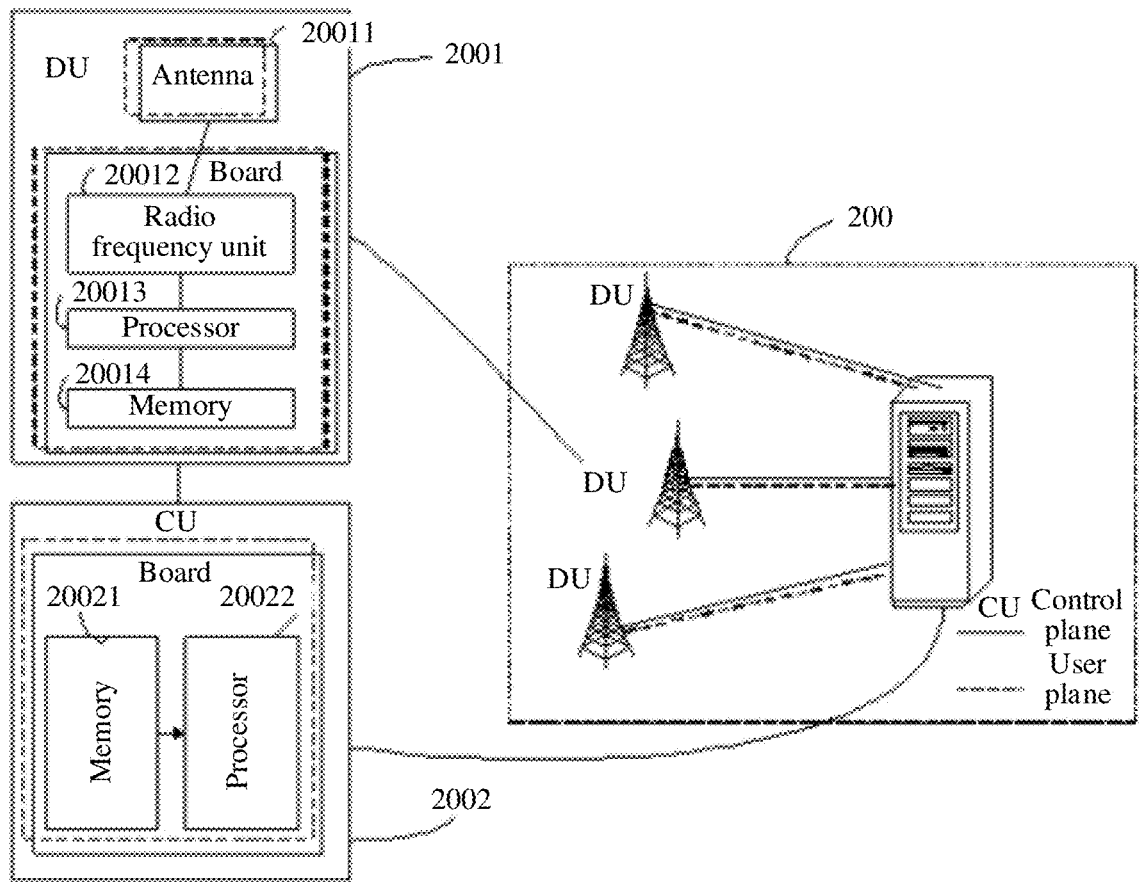
FIG. 20 is another schematic diagram of a structure of a communication apparatus according to an embodiment.

FIG. 20 is another schematic diagram of a structure of a communication apparatus according to an embodiment.

The communication apparatus 200 may be the source IAB donor or the target IAB donor in the embodiment corresponding to FIG. 6, FIG. 8, FIG. 9A and FIG. 9B, or FIG. 10. The communication apparatus 200 may use a CU-DU split architecture. As shown in FIG. 20, the communication apparatus 200 may be applied to the scenario shown in FIG. 1, FIG. 2, FIG. 5, or FIG. 7, to implement a function of the IAB donor (the source IAB donor and/or the target IAB donor) in the foregoing method embodiment.

The communication apparatus 200 may include one or more DUs 2001 and one or more CUs 2002. The DU 2001 may include at least one antenna 20011, at least one radio frequency unit 20012, at least one processor 20013, and at least one memory 20014. The DU 2001 may be configured to: send and receive a radio frequency signal, perform conversion between a radio frequency signal and a baseband signal, and perform partial baseband processing. The CU 2002 may include at least one processor 20022 and at least one memory 20021. The CU 2002 and the DU 2001 may communicate with each other through an interface. A control plane interface may be F1-C, and a user plane interface may be F1-U.

The CU 2002 may be configured to: perform baseband processing, control a base station, and the like. The DU 2001 and the CU 2002 may be physically disposed together, or may be physically disposed separately, namely, a distributed base station. The CU 2002 is a control center of the base station, may also be referred to as a processing unit and may be configured to implement a baseband processing function. For example, the CU 2002 may be configured to control the base station to perform an operation procedure related to the network device in the foregoing method embodiment.

Baseband processing on the CU and the DU may be classified based on a protocol layer of a wireless network. For details, refer to the foregoing content.

In an instance, the CU 2002 may include one or more boards, and a plurality of boards may jointly support a radio access network (for example, a 5G network) of a single access standard, or may separately support radio access networks (for example, an LTE network, a 5G network, or another access network) of different access standards. The memory 20021 and the processor 20022 may serve one or more boards. In other words, a memory and a processor may be separately disposed on each board. Alternatively, a plurality of boards may share a same memory and a same processor. In addition, a necessary circuit may be further disposed on each board. The DU 2001 may include one or more boards, and a plurality of boards may jointly support a radio access network (for example, a 5G network) of a single access standard, or may separately support radio access networks (for example, an LTE network, a 5G network, or another access network) of different access standards. The memory 20014 and the processor 20013 may serve one or more boards. In other words, a memory and a processor may be separately disposed on each board. Alternatively, a plurality of boards may share a same memory and a same processor. In addition, a necessary circuit may be further disposed on each board.

Optionally, the CU 2002 may perform transmission with a child node of an access network device through the DU 2001, the CU 2002 may be connected to another access network device through an interface, and the CU 2002 may receive data and/or a message from another access network device (for example, a CU of another access network device) through the interface. Alternatively, the CU 2002 may send data and/or a message to another access network device through the interface.

For example, in the embodiment corresponding to FIG. 9A and FIG. 9B, when the communication apparatus 200 is the target IAB donor, a CU of the target IAB donor is connected to a first IAB node through a DU and an antenna. The CU of the target IAB donor sends a second message to an MT of the first IAB node through the DU and the antenna, where the second message is used by the first IAB node to send a first message to a second node based on the second message by using a signaling radio bearer SRB 1 or an SRB 2, or used by the first IAB node to send a BH RLF indication to a second node, where before the first IAB node sets up the first RRC connection to the target IAB donor by performing RLF recovery, the second node is connected to a source IAB donor through the first IAB node, and the second node is a child node or a descendent UE of the first IAB node.

For example, in the embodiment corresponding to FIG. 10, when the communication apparatus 200 is the target IAB donor, a CU of the target IAB donor is connected to a CU of a source IAB donor. The CU of a target IAB donor sends a first RRC reconfiguration message to the CU of the source IAB donor. The CU of the target IAB donor receives a third message from the CU of the source IAB donor, where the third message is an RRC reconfiguration message obtained by performing encryption and/or integrity protection on the first RRC reconfiguration message. The CU of the target IAB donor is further connected to a first IAB node through a DU and an antenna. The CU of the target IAB donor further sends the third message to the first IAB node through the DU and the antenna. Before the first IAB node sets up the first RRC connection to the target IAB donor by performing RLF recovery, a second node is connected to the source IAB donor through the first IAB node, and the second node is a child node or a descendent UE of the first IAB node.

In several embodiments, it should be understood that the system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, may be located in one position or may be distributed on a plurality of network units. Some or all of the units may be selected based on an actual requirement to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware or may be implemented in a form of a software functional unit.

When the integrated unit is implemented in the form of the software functional unit and sold or used as an independent product, the integrated unit may be stored in a computer-readable storage medium. Based on such an understanding, the embodiments may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, such as a flash memory disk, a removable hard disk, a ROM, a RAM, a magnetic disk, or an optical disc.

What is claimed is:

1. A communication apparatus, which is a first integrated access and backhaul (IAB) node or included in the first IAB node, wherein the communication apparatus comprises;

a processor, wherein the processor is coupled to a memory; and the memory, configured to store a computer program, wherein the processor is configured to execute the computer program stored in the memory, to cause the communication apparatus to perform operations, comprising:

setting up a first radio resource control (RRC) connection to a target IAB donor by performing radio link failure (RLF) recovery; and after setting up the first RRC connection to the target IAB donor by performing the RLF recovery, sending a first message to a second node by using a signaling radio bearer (SRB) 1 or an SRB 2, or sending a backhaul radio link failure (BH RLF) indication to a second node, wherein the first message or the BH RLF indication is used to set up a second RRC connection between the second node and the target IAB donor, wherein before the setting up the first RRC connection to the target IAB donor by performing the RLF recovery, the second node is connected to a source IAB donor through the first IAB node, and the second node is a child node or a descendent user equipment (UE) of the first IAB node, wherein the first message is an RRC message, and before sending, by the first IAB node, the first message to the second node, and after setting up, by the first IAB node, the first RRC connection to the target IAB donor by performing the RLF recovery, the operations further comprise:

receiving a second message from the target IAB donor, wherein the second message comprises an SRB identifier and the RRC message, and the SRB identifier comprises an identifier of the SRB 1 and an identifier of the SRB 2.

2. The communication apparatus according to claim 1 wherein the second message further comprises first indication information; and wherein sending the BH RLF indication to the second node further comprises:

sending the BH RLF indication to the second node based on the first indication information.

3. The communication apparatus according to claim 2, wherein the second message is an RRC re-establishment message.

4. The communication apparatus according to claim 2, wherein the first indication information indicates that RRC re-establishment performed by the first IAB node is RRC re-establishment across IAB donors.

5. The communication apparatus according to claim 1, wherein before sending, by the first IAB node, the first message or the BH RLF indication to the second node, the operations further comprise:

sending an update notification to the second node; and broadcasting an updated physical cell identifier (PCI) of the first IAB node, wherein the update notification indicates the second node to obtain the updated PCI, and the updated PCI is used by the second node to correctly receive the first message or the BH RLF indication.

6. A communication apparatus, which is a target integrated access and backhaul (IAB) donor or included in the target IAB donor, wherein the communication apparatus comprises:

a processor, wherein the processor is coupled to a memory; and the memory, configured to store a computer program, wherein the processor is configured to execute the computer program stored in the memory, to cause the communication apparatus to perform operations, comprising:

sending a second message to a first IAB node, wherein the second message is used by the first IAB node to send a first message to a second node based on the second message by using a signaling radio bearer (SRB) 1 or an SRB 2, or used by the first IAB node to send a backhaul radio link failure (BH RLF) indication to a second node, wherein before the first IAB node sets up a radio resource control (RRC) connection to the target IAB donor by performing RLF recovery, the second node is connected to a source IAB donor through the first IAB node, and the second node is a child node or a descendent user equipment (UE) of the first IAB node, wherein the first message is an RRC message, the second message comprises an SRB identifier and the RRC message, and the SRB identifier comprises an identifier of the SRB 1 and an identifier of the SRB 2; and wherein sending the second message to the first IAB node further comprises:

after the first IAB node sets up the first RRC connection to the target IAB donor by performing the RLF recovery, sending, by the target IAB donor, the second message to the first IAB node.

7. The communication apparatus according to claim 6, wherein the second message is an RRC re-establishment message, the RRC re-establishment message comprises first indication information, and the first indication information is used by the first IAB node to send the BH RLF indication to the second node based on the first indication information.

8. The communication apparatus according to claim 7, wherein the first indication information indicates that RRC re-establishment performed by the first IAB node is RRC re-establishment across IAB donors.

9. The communication apparatus according to claim 6, wherein the second message further comprises an identifier of the second node, and before the first IAB node sets up the first RRC connection to the target IAB donor by performing the RLF recovery, the operations further comprise:

sending a context obtaining request to the source IAB donor; and receiving a context obtaining response from the source IAB donor, wherein the context obtaining response comprises the identifier of the second node.

10. A communication system, the communication system comprising:

an integrated access and backhaul (IAB) node and a target IAB donor;

wherein the first IAB node is configured to:

set up a first radio resource control (RRC) connection to the target IAB donor by performing radio link failure (RLF) recovery; and after setting up the first RRC connection to the target IAB donor by performing the RLF recovery, send a first message to a second node by using a signaling radio bearer (SRB) 1 or an SRB 2, or send a backhaul radio link failure indication (BH RLF) indication to a second node, wherein the first message or the BH RLF indication is used to set up a second RRC connection between the second node and the target IAB donor, wherein before setting up the first RRC connection to the target IAB donor by performing the RLF recovery, the second node is connected to a source IAB donor through the first IAB node, and the second node is a child node or a descendent user equipment (UE) of the first IAB node;

wherein the target IAB donor is configured to:

send a second message to the first IAB node, wherein the second message is used by the first IAB node to send the first message to the second node based on the second message by using the SRB 1 or the SRB 2 or used by the first IAB node to send the BH RLF indication to a second node, wherein the first message is an RRC message, and wherein the first IAB node is further configured to receive a second message from the target IAB donor, wherein the second message comprises an SRB identifier and the RRC message, and the SRB identifier comprises an identifier of the SRB 1 and an identifier of the SRB 2.

11. The communication system according to claim 10, wherein the first IAB node is further configured to receive a second message from the target IAB donor, wherein the second message comprises first indication information, and the BH RLF indication is sent to the second node based on the first indication information.

12. The communication system according to claim 10, wherein the second message is an RRC re-establishment message.

13. The communication system according to claim 10, wherein the first indication information indicates that RRC re-establishment performed by the first IAB node is RRC re-establishment across IAB donors.

14. The communication system according to claim 10, wherein the first IAB node is further configured to send an update notification to the second node and broadcast an updated physical cell identifier (PCI) of the first IAB node, wherein the update notification indicates the second node to obtain the updated PCI, and the updated PCI is used by the second node to correctly receive the first message or the BH RLF indication.

15. The communication system according to claim 10, wherein the second message is an RRC re-establishment message, the RRC re-establishment message comprises first indication information, and the first indication information is used by the first IAB node to send the BH RLF indication to the second node based on the first indication information.

16. The communication system according to claim 10, wherein the target IAB donor is further configured to send a context obtaining request to the source IAB donor and receive a context obtaining response from the source IAB donor, wherein the context obtaining response comprises the identifier of the second node.

* * * * *